__US011273986B2__

(12) United States Patent
Itoh et al.

(10) Patent No.: US 11,273,986 B2
(45) Date of Patent: Mar. 15, 2022

(54) CONVEYANCE DEVICE AND CONVEYANCE DIRECTION CHANGING DEVICE

(71) Applicant: ITOH DENKI CO., LTD., Kasai (JP)

(72) Inventors: Kazuo Itoh, Kasai (JP); Tatsuhiko Nakamura, Kasai (JP); Koji Ueda, Kasai (JP); Takuya Nagasawa, Kasai (JP)

(73) Assignee: Itoh Denki Co., Ltd., Kasai (JP)

( * ) Notice: Subject to any disclaimer, the term of this patent is extended or adjusted under 35 U.S.C. 154(b) by 0 days.

(21) Appl. No.: 17/084,027

(22) Filed: Oct. 29, 2020

(65) Prior Publication Data

US 2021/0139244 A1    May 13, 2021

(30) Foreign Application Priority Data

Nov. 7, 2019  (JP) .............................. JP2019-202055
Jan. 27, 2020  (JP) .............................. JP2020-010635
Jun. 3, 2020  (JP) .............................. JP2020-096704

(51) Int. Cl.
  *B65G 13/07*  (2006.01)
  *B65G 13/10*  (2006.01)
  (Continued)

(52) U.S. Cl.
  CPC ............. *B65G 13/10* (2013.01); *B65G 13/04* (2013.01); *B65G 39/12* (2013.01)

(58) Field of Classification Search
  CPC ........ B65G 13/02; B65G 13/04; B65G 13/06; B65G 13/07; B65G 13/073; B65G 13/10;
  (Continued)

(56) References Cited

U.S. PATENT DOCUMENTS 4,018,322 A * 4/1977 Brown .................... B60B 33/08
  193/37
4,372,435 A * 2/1983 Bradbury ............... B65G 13/10
  193/36

(Continued)

FOREIGN PATENT DOCUMENTS

DE         86 29 392 U1    4/1987
DE    10 2008 024607 A1   11/2009
(Continued)

OTHER PUBLICATIONS

Partial European Search Report dated Apr. 6, 2021 in European Patent Application No. 20 20 4896.

*Primary Examiner* — Joseph A Dillon, Jr.
(74) *Attorney, Agent, or Firm* — Wood, Phillips, Katz, Clark & Mortimer

(57) ABSTRACT

A conveyance roller 3 including a support shaft 31, a main rotating portion 34, and a sub rotating portion 35, and a driving body 50 that is in contact with the main rotating portion 34 and the sub rotating portion 35 and that supplies a rotational force to the main rotating portion 34 and the sub rotating portion 35 are provided, wherein the main rotating portion 34 and the sub rotating portion 35 are attached along the support shaft 31 and are rotatable independently of each other around the support shaft 31, the sub rotating portion 35 is not configured to contact an object to be conveyed but the main rotating portion 34 is configured to contact the object to be conveyed and bias the object to be conveyed, the driving body 50 is rotated by power around a rotation shaft 51 in a direction intersecting with the support shaft 31, the support shaft 31 is configured to change an orientation of the support shaft 31 by rotating around the rotation shaft 51, and the driving body 50 is in contact with the main rotating (Continued)

portion 34 and the sub rotating portion 35 regardless of the orientation of the support shaft 31.

23 Claims, 18 Drawing Sheets

(51) Int. Cl.
    *B65G 13/04*     (2006.01)
    *B65G 39/12*     (2006.01)

(58) Field of Classification Search
    CPC ........ B65G 13/11; B65G 23/22; B65G 23/24; B65G 23/26; B65G 39/02; B65G 39/04; B65G 2207/34; B65H 2404/1321; B65H 2404/133; D01H 5/82
    USPC ............. 198/369.2, 370.09, 371.3, 782, 791; 193/35 MD; 492/39
    See application file for complete search history.

(56) References Cited

U.S. PATENT DOCUMENTS

| | | | | |
|---|---|---|---|---|
| 4,427,106 A * | 1/1984 | Wooldridge | ........... | B65G 39/12 198/842 |
| 4,589,542 A * | 5/1986 | Steadman | ................ | B64D 9/00 198/782 |
| 5,020,657 A * | 6/1991 | Huber | ...................... | B64D 9/00 198/782 |
| 5,222,585 A * | 6/1993 | van der Werff | ........ | B65G 13/07 193/35 MD |
| 5,415,266 A * | 5/1995 | van der Werff | ........ | B65G 13/07 193/35 MD |
| 5,921,374 A * | 7/1999 | Takino | ................... | B65G 13/10 198/369.4 |
| 6,340,083 B1 * | 1/2002 | Zhou | ........................ | B64D 9/00 198/370.09 |
| 6,889,815 B2 * | 5/2005 | Kanamori | ............ | B65G 1/0478 198/369.4 |
| 7,040,478 B2 * | 5/2006 | Ehlert | .................... | B65G 13/10 198/369.4 |
| 8,978,879 B2 * | 3/2015 | Fourney | ................. | B65G 39/12 198/782 |
| 9,309,954 B2 * | 4/2016 | Wilkins | ............... | B65G 39/025 |
| 9,878,856 B2 * | 1/2018 | Specht | ................... | B65G 13/02 |
| 10,518,975 B2 * | 12/2019 | Itoh | ........................ | B65G 47/46 |
| 10,549,917 B2 * | 2/2020 | Garehan | ............... | B65G 13/10 |
| 10,577,189 B2 * | 3/2020 | Itoh | ........................ | B65G 15/22 |
| 10,843,872 B2 * | 11/2020 | Guglielmi | ............ | B65G 39/025 |
| 10,850,843 B2 * | 12/2020 | Dallum | ................... | F16C 17/04 |
| 11,008,175 B1 * | 5/2021 | Watts | ..................... | F16M 11/18 |
| 2005/0040009 A1 * | 2/2005 | Ehlert | .................... | B65G 13/10 198/369.4 |
| 2008/0169171 A1 * | 7/2008 | Itoh | ........................ | B65G 13/10 198/412 |
| 2010/0052447 A1 * | 3/2010 | Kadoya | ................. | F16C 17/107 310/90 |
| 2010/0065400 A1 * | 3/2010 | Pruett | ................... | B65G 39/025 193/35 MD |
| 2014/0116841 A1 * | 5/2014 | Wilkins | ............... | B65G 13/065 198/369.1 |
| 2018/0111767 A1 * | 4/2018 | Itoh | ...................... | B65G 47/244 |
| 2019/0135542 A1 * | 5/2019 | Itoh | ...................... | B65G 13/10 |
| 2020/0385213 A1 | 12/2020 | Itoh et al. | | |
| 2021/0009363 A1 * | 1/2021 | Kim | ...................... | B65G 13/10 |

FOREIGN PATENT DOCUMENTS

| | | |
|---|---|---|
| JP | H02 144313 A | 6/1990 |
| JP | 2012-051680 A | 3/2012 |
| JP | 2015-163547 A | 9/2015 |
| JP | 2015-163549 A | 9/2015 |
| WO | 2019/167864 A1 | 9/2019 |

* cited by examiner

CONVEYANCE DEVICE AND CONVEYANCE DIRECTION CHANGING DEVICE

TECHNICAL FIELD

The present invention relates to a conveyance device that conveys objects to be conveyed, and more particularly to a conveyance device that carries out objects to be conveyed in various directions and carries in objects to be conveyed from various directions.

The present invention also relates to a conveyance direction changing device that changes a conveyance direction of objects to be conveyed.

BACKGROUND ART

A wide variety of objects to be conveyed may be handled in a delivery site, a collecting site, a warehouse, or the like. In addition, a large number of objects to be conveyed may be sorted, loaded on a truck, and transported to a specific shelf.

The objects to be conveyed have been sorted by a sorting system in which a plurality of transfer devices as in Patent Documents 1, 2, and 3 are installed.

The transfer devices disclosed in Patent Documents 1 and 2 have a main conveyance passage that linearly passes objects to be conveyed and a sub conveyance passage that conveys the objects to be conveyed in an orthogonal direction, and can transfer the objects to be conveyed to another conveyor line.

The transfer device disclosed in Patent Document 3 has a main conveyance passage that linearly passes objects to be conveyed and a discharging device that discharges the objects to be conveyed in an oblique direction, and can carry out the objects to be conveyed in the oblique direction and transfer the objects to be conveyed to another conveyor line.

In the sorting system of the related art, a large number of transfer devices as described above are disposed and the conveyor line is complexly branched. Then, the objects are conveyed by the sorting system, transferred to a branch of the conveyor line branched from the original conveyor line, and moved to the intended destination while the destination is gradually narrowed down.

PRIOR ART DOCUMENTS

Patent Documents

Patent Document 1: JP 2015-163549 A
Patent Document 2: JP 2012-51680 A
Patent Document 3: JP 2015-163547 A

DISCLOSURE OF INVENTION

Technical Problem

The transfer device of the related art selectively carries out the objects to be conveyed in two specific directions.

Thus, the sorting system of the related art makes complexly branched conveyor lines, and is considerably large. That is, constructing the sorting system of the related art requires a large installation space.

Then, the present invention focuses on the above problem of the related art, and an object of the present invention is to develop a conveyance device and a conveyance direction changing device capable of carrying out objects to be conveyed in an arbitrary direction without requiring a large installation space.

Solution to Problem

A first aspect for solving the above problems is a conveyance device including: a rotating body including a main rotating portion and a sub rotating portion; and a driving body in contact with the main rotating portion and the sub rotating portion, the driving body supplying a rotational force to at least the main rotating portion, wherein the main rotating portion is rotatable around a first rotation axis while the sub rotating portion is rotatable in a direction different from a rotation direction of the main rotating portion, wherein the sub rotating portion is configured not to contact an object to be conveyed while the main rotating portion is configured to contact and bias the object to be conveyed, wherein the driving body is rotated by power around a second rotation axis, the second rotation axis having a direction intersecting with the first rotation axis, wherein the rotating body is configured to change an orientation of the rotating body, and wherein the driving body is in contact with the main and the sub rotating portions regardless of the orientation of the rotating body.

In this aspect, preferably, the rotating body has a support shaft, the driving body is in contact with the main rotating portion and the sub rotating portion and supplies the rotational force to the main rotating portion and the sub rotating portion, the main rotating portion and the sub rotating portion are attached along the support shaft and are rotatable independently of each other around the support shaft, and the support shaft is configured to change the orientation of the support shaft by rotating around a third rotation axis.

A specific aspect is a conveyance device including a rotating body including a support shaft, a main rotating portion, and a sub rotating portion, wherein the driving body is in contact with the main and the sub rotating portions to supply the rotational force to the main and the sub rotating portions, wherein the main and the sub rotating portions are attached along the support shaft, thereby being rotatable around the support shaft independently from each other, wherein the sub rotating portion is not configured to contact an object to be conveyed, while the main rotating portion is configured to contact and bias the object to be conveyed, wherein the driving body is rotated by power around a rotation axis in a direction intersecting with the support shaft, wherein the support shaft is configured to change an orientation of the support shaft by rotating around the rotation axis, and wherein the driving body is in contact with the main and the sub rotating portions regardless of the orientation of the support shaft.

Here, the "rotation axis" refers to an axis serving as a rotation center, and is a concept including a virtual axis having no physical substance.

On the other hand, the "support shaft" is an "object" that has physical substance.

In this aspect, the conveyance device has the rotating body and the driving body.

The rotating body includes the support shaft, and the main rotating portion and a sub rotating portion attached along the support shaft. That is, the main rotating portion is attached to a part on one side of the support shaft, and the sub rotating portion is attached to a part of the support shaft on the other side to the main rotating portion.

Then, the support shaft receives an external force (pressing force) from the driving body that is in contact with the main rotating portion and the sub rotating portion attached along the support shaft. This equalizes the force coming from the driving body and acting on the support shaft.

In other words, the external force (pressing force) that the support shaft receives from the driving body acts on the support shaft via the part of the support shaft to which the main rotating portion is attached and the part to which the sub rotating portion is attached. Here, the main rotating portion and the sub rotating portion are attached along the support shaft, and the external force does not act on a specific biased part of the support shaft.

That is, the external force (pressing force), which is dispersed and acts on the parts separated along the support shaft, does not tilt the support shaft and thus stabilizes the posture of the rotating body attached to the support shaft.

The driving body is in contact with and transmits power to both the main rotating portion and the sub rotating portion, and thus the posture of the driving body is also stable.

The driving body has a function of rotating by the power around the rotation axis in a direction intersecting with the support shaft, contacting the main rotating portion and the sub rotating portion, and supplying the rotational force to the main rotating portion and the sub rotating portion. That is, the driving body contacts and presses the main rotating portion and the sub rotating portion and supplies a rotational force.

The main rotating portion and the sub rotating portion are rotatable independently of each other around the support shaft, and the sub rotating portion is not configured to contact the object to be conveyed, but the main rotating portion is configured to contact the object to be conveyed and bias the object to be conveyed. That is, the object to be conveyed is biased and conveyed by the main rotating portion which is rotating.

Further, the object to be conveyed does not contact the sub rotating portion and is not biased by the sub rotating portion. In other words, the object to be conveyed is not subjected to the biasing force from the sub rotating portion, and even when the sub rotating portion is rotating in an opposite direction to the main rotating portion, the object to be conveyed is biased and conveyed only by the main rotating portion. This conveys the object to be conveyed stably.

Further, because the support shaft can rotate around the rotation axis and can change the orientation, and the driving body is in contact with the main rotating portion and the sub rotating portion regardless of the orientation of the support shaft, the conveyance direction is determined by the orientation of the support shaft, and the object to be conveyed is conveyed in the conveyance direction by receiving the biasing force from the main rotating portion. That is, when the orientation of the support shaft is changed and the conveyance direction of the object to be conveyed is changed, the power can be still transmitted from the driving body to the main rotating portion, and the object to be conveyed can be sent out in any desired direction. Then, the conveyance device according to the present aspect can convey the object to be conveyed in various directions.

Here, the "intersecting direction" includes an orthogonally crossing direction and an obliquely intersecting direction. Further, "intersection" includes not only a state where the axes intersect, but also a state where the axes intersect three-dimensionally. That is, crossing in a staggered state is included.

The driving body is rotated around the rotation axis by the power. The rotation axis is an axis extending in a direction intersecting with the support shaft. The rotation axis of the driving body and the support shaft of the main rotating portion of the rotating body intersect with each other, and thus when the driving body rotates, the main rotating portion is tangentially biased to rotate and can bias and convey the object to be conveyed.

In the conveyance device according to the above aspect, the main rotating portion and the sub rotating portion are attached along the support shaft and can rotate independently of each other around the support shaft. However, the main rotating portion and the sub rotating portion may be restricted to rotate in opposite directions.

An aspect that achieves this is the conveyance device configured such that the rotating body has a support shaft, the driving body is in contact with the main and the sub rotating portions to supply the rotational force to the main and the sub rotating portions, the main and the sub rotating portions are attached along the support shaft, thereby being regulated to rotate around the support shaft in an opposite direction with each other, and the support shaft is configured to rotate around a third shaft to change the orientation of the support shaft.

A specific aspect is a conveyance device including: a rotating body provided with a support shaft, a main rotating portion, and a sub rotating portion; and a driving body that is in contact with the main rotating portion and the sub rotating portion, the driving body supplying a rotational force to the main rotating portion and the sub rotating portion, wherein the main rotating portion and the sub rotating portion are attached along the support shaft, thereby being regulated to rotate around the support shaft in opposite directions, wherein the sub rotating portion is not configured to contact an object to be conveyed while the main rotating portion is configured to contact and bias the object to be conveyed, wherein the driving body is rotated by power around a rotation axis in a direction intersecting with the support shaft, wherein the support shaft is configured to change an orientation of the support shaft by rotating around the rotation axis, and wherein the driving body is in contact with the main rotating portion and the sub rotating portion regardless of the orientation of the support shaft.

Also, in the conveyance device according to the present aspect, the driving body is rotated by power around the rotation axis in the direction intersecting with the support shaft.

Here, because the driving body is a rotating body, regarding the contact portion between the driving body and the main rotating portion, and the contact portion between the driving body and the sub rotating portion, the contact portions of the driving body move in directions opposite to each other. For example, when the main rotating portion is biased in a right rotation direction by the driving body, the sub rotating portion is biased in a left rotation direction.

In the conveyance device according to the present aspect, the main rotating portion and the sub rotating portion are regulated to rotate in the opposite directions around the support shaft. Thus, the biasing direction of the driving body and the rotation direction of each rotating body are in a forward direction.

This eliminates unnecessary friction.

In this aspect, an intermediate rotating body is preferably interposed between the main rotating portion and the sub rotating portion to regulate the main and the sub rotating portions so as to rotate in an opposite direction with each other.

In this aspect, a bevel gear is preferably interposed between the main and the sub rotating portions to regulate the main and the sub rotating portions so as to rotate in an opposite direction with each other.

In this aspect, a bevel gear with internal teeth is provided both inside the main and the sub rotating portions, the bevel gears with the internal teeth being engaged with a bevel gear with external teeth.

In this aspect, preferably, an external shape combining the main and the sub rotating portions is a spherical shape, a barrel shape, or a cylindrical shape, a part of a circumference of the main rotating portion around a direction of the first rotation axis and a part of a circumference of the sub rotating portion around the direction of the first rotation axis are in contact with the driving body regardless of the orientation of the rotating body, and the other parts of the main rotating portion and the sub rotating portion are substantially not in contact with the driving body.

Here, "substantially" means not only when the main rotating portion and the sub rotating portion are not in contact with each other, but also when the main rotating portion and the sub rotating portion are in contact with each other to an extent that the main rotating portion and the sub rotating portion do not exert a force on each other.

According to this configuration, the external shape obtained by combining the main rotating portion and the sub rotating portion is laterally symmetrical, and the external force (pressing force) is easily evenly supplied from the driving body to the support shaft via the main rotating portion and the sub rotating portion. Then, apart of a circumference of the main rotating portion and a part of a circumference of the sub rotating portion around a direction of the support shaft is in contact with the driving body regardless of the orientation of the support shaft, and the other parts of the main rotating portion and the sub rotating portion are substantially not in contact with the driving body, and thus the main rotating portion and the sub rotating portion rotate stably. As a result, the rotating body (main rotating portion) can bias the object to be conveyed similarly in any direction.

Here, the "external shape obtained by combining the main rotating portion and the sub rotating portion" refers to a shape (contour) of an entire circumference including the main rotating portion and the sub rotating portion except for a part where the main rotating portion and the sub rotating portion face each other.

In this aspect, preferably, the driving body includes a contact portion having an annular shape, the contact portion is in contact with a part of the main rotating portion and a part of the sub rotating portion, and the contact portion rotates to cause the main and the sub rotating portions to rotate.

With this structure, the driving body has the contact portion having an annular shape, and the entire circumference of the contact portion contacts the main rotating portion and the sub rotating portion stably.

The conveyance device of this aspect preferably includes a first power transmission member that transmits power from another member to the driving body to cause the driving body to rotate.

The first power transmission member is one of the members configuring a series of power transmission mechanisms. That is, the first power transmission member is a member or a part configured to reliably transmit the power supplied from a power source such as a motor to the driving body.

The conveyance device of this aspect preferably includes: a support member that rotatably supports the main and the sub rotating portions around the first rotation axis; and a second power transmission member that causes the support member to rotate around a rotation axis in a direction intersecting with the first rotation axis when the power is transmitted from another member.

The second power transmission member is one of the members configuring a series of power transmission mechanisms. For example, when a gear train is configured as a power transmission mechanism, individual gears transmit the power to the "second power transmission member". When a friction wheel train is configured as a power transmission mechanism, individual friction wheels transmit the power to the "second power transmission member". When a chain transmission or a belt transmission is configured as a power transmission mechanism, a sprocket or a pulley transmits the power to the "second power transmission member".

In this aspect, a part of the main rotating portion and a part of the sub rotating portion preferably include an elastically deformable material, the part of the main rotating portion and the part of the sub rotating portion being in contact with the driving body.

With this configuration, the part of the main rotating portion and the part of the sub rotating portion that is in contact with the driving body is elastically deformed, and an area where the main rotating portion and the sub rotating portion are in contact with the driving body is expanded. The power is therefore easily transmitted from the driving body to the main rotating portion and the sub rotating portion.

Here, the elastic deformation does not mean such a large deformation that the external shapes of the main rotating portion and the sub rotating portion are changed, but means a local deformation such that the part in contact with the driving body is slightly recessed.

It is preferable to configure a conveyance direction changing device so as to include a plurality of the conveyance devices according to the present aspect, wherein the plurality of the conveyance devices are disposed in a plane, and wherein power is transmitted between the second power transmission members of the adjacent conveyance devices.

The power is transmitted between the second power transmission members by, for example, a gear, a chain, or a belt.

It is preferable to configure a conveyance direction changing device so as to include a plurality of the conveyance devices according to the present aspect; and a fixing member having a flat surface, the flat surface including a plurality of holes disposed in a plane, the conveyance devices being disposed in the holes, each of the holes including a hanging portion that hangs downward at an edge of each of the holes, wherein the support member of each of the conveyance devices has an engagement portion slidably engaged with the hanging portion, and wherein an upper portion of the main rotating portion of each of the conveyance devices protrudes above the flat surface of the fixing member.

The conveyance direction changing device having this configuration has the fixing member having the flat surface, wherein the flat surface is provided with the plurality of holes disposed in a plane, and wherein the conveyance devices are disposed in the holes. Thus, the object to be conveyed is biased and conveyed by the plurality of conveyance devices.

The hanging portion that hangs downward is provided at the edge of each of the holes, the support member of each of the conveyance devices has the engagement portion slidably engaged with the hanging portion. Thus, when the support member rotates, the engagement portion slides on the annular hanging portion.

That is, the support member rotates along the hanging portion, and the hanging portion functions as a guide when the support member rotates. Here, the "engagement portion slidably engaged with the hanging portion" is specifically an annular groove.

Further, since the upper portion of the main rotating portion of each conveyance device protrudes above the flat surface of the fixing member, the object to be conveyed can be conveyed by the main rotating portion protruding upward.

Then, when each support member slides on the fixing member and rotates, the orientation of the support shaft is changed and the biasing direction of a main rotating portion is changed. That is, the conveyance direction of the object to be conveyed is changed.

In the conveyance direction changing device according to the present aspect, each support member can be attached to the fixing member without interposing a bearing. Therefore, a structure of the conveyance direction changing device is simple, and each support member can be assembled to the fixing member with a single touch, which is extremely easy.

In particular, in the conveyance direction changing device provided with a plurality of the rotating bodies, each support member of the plurality of rotating bodies must be individually attached to the fixing member. Thus, the conveyance direction changing device according to the present aspect, in which each support member can be attached to the fixing member with a single touch, can be assembled significantly easily and in a short time.

A second aspect is a conveyance direction changing device including: a plurality of conveyance devices conveying an object to be conveyed; and a fixing member having a flat surface, the conveyance direction changing device being capable of changing a direction in which each of the conveyance devices conveys an object to be conveyed, the flat surface including a plurality of holes disposed in a plane, the conveyance devices being disposed in the holes, each of the holes including a hanging portion that hangs downward at an edge of each of the holes, wherein each of the conveyance devices includes: a biasing member that biases and conveys the object to be conveyed; and a support member that supports the biasing member, wherein the support member of each of the conveyance devices has an engagement portion slidably engaged with the hanging portion, wherein the support member of each of the conveyance devices is rotatable around a center line of each of the holes when power is transmitted from another member, and wherein an upper portion of the biasing member of each of the conveyance devices protrudes above the flat surface of the fixing member.

The conveyance direction changing device having this configuration has the fixing member having the flat surface, wherein the flat surface is provided with the plurality of holes disposed in a plane, and the conveyance devices are disposed in the holes. Thus, the object to be conveyed is biased and conveyed by the plurality of conveyance devices.

Each conveyance device has the biasing member that biases the object to be conveyed and conveys the object to be conveyed, and the support member that supports the biasing member.

The biasing member specifically includes a rotating body such as a sphere or a roller (short roller), or a traveling body such as an annular belt or an annular chain.

The hanging portion that hangs downward is provided at the edge of each of the holes, the support member of each of the conveyance devices has the engagement portion slidably engaged with the hanging portion. Thus, when the support member rotates, the engagement portion slides on the hanging portion.

That is, the support member rotates along the hanging portion, and the hanging portion functions as a guide when the support member rotates. Here, the "engagement portion slidably engaged with the hanging portion" is specifically an annular groove.

Further, the upper portion of the biasing member of each conveyance device protrudes above the flat surface of the fixing member, and thus the object to be conveyed can be conveyed by the biasing member protruding upward.

Then, when each support member slides on the fixing member and rotates, the orientation of the support shaft is changed and the biasing direction of a main rotating portion is changed. That is, the conveyance direction of the object to be conveyed is changed.

In the conveyance direction changing device according to the present aspect, each support member can be attached to the fixing member without interposing a bearing. Therefore, a structure of the conveyance direction changing device is simple, and each support member can be assembled to the fixing member with a single touch, which is extremely easy.

In particular, in the conveyance direction changing device provided with a plurality of the rotating bodies, each support member of the plurality of rotating bodies must be individually attached to the fixing member. Thus, the conveyance direction changing device according to the present aspect, in which each support member can be attached to the fixing member with a single touch, can be assembled significantly easily and in a short time.

Effect of Invention

The conveyance device and the conveyance direction changing device of the present invention can carry out objects to be conveyed in various directions, and can construct a sorting system that sorts the objects to be conveyed in a narrow space.

BRIEF DESCRIPTION OF DRAWINGS

FIGS. 11A and 11B are partially enlarged sectional views of the conveyance direction changing device, wherein FIG. 11A shows a state immediately before the conveyance device is attached to an opening of a top plate, and FIG. 11B shows a state where the conveyance device has been attached to the opening of the top plate.

FIGS. 12A and 12B are partial sectional views of the conveyance direction changing device showing a state where the conveyance device is attached to an opening of a top plate having a form different from that of FIG. 11, wherein FIG. 12A shows a state immediately before the conveyance device is attached to the opening of the top plate, and FIG. 12B shows a state where the conveyance device has been attached to the opening of the top plate.

BEST MODE FOR CARRYING OUT THE INVENTION

Hereinafter, description will be given with reference to the drawings.

In the following description, a vertical relationship is based on a posture during use.

Figure 1:
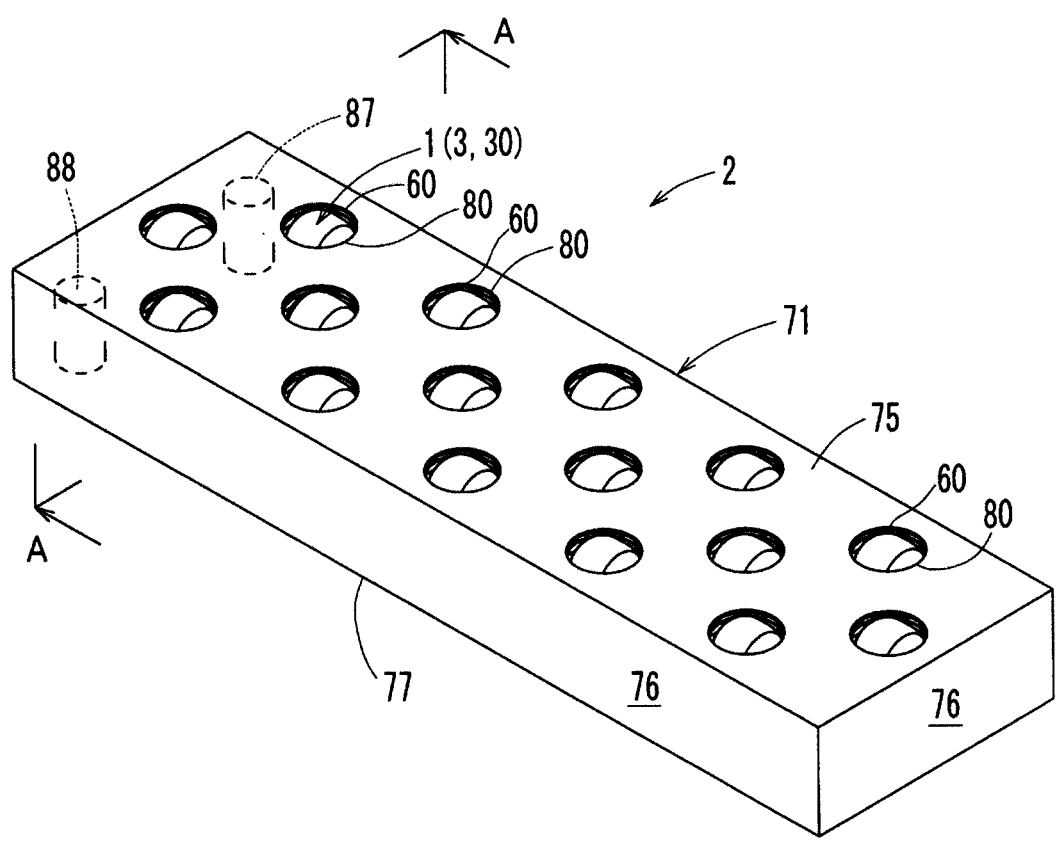
FIG. 1 is a perspective view of a conveyance direction changing device according to an embodiment of the present invention.

FIG. 1 shows a conveyance direction changing device 2 according to an embodiment of the present invention. As shown in FIG. 1, a conveyance direction changing device 2 is configured by arranging multiple small conveyance devices 1 in a plane. That is, multiple conveyance devices 1 are spread in a plane to configure the conveyance direction changing device 2.

Figure 8:
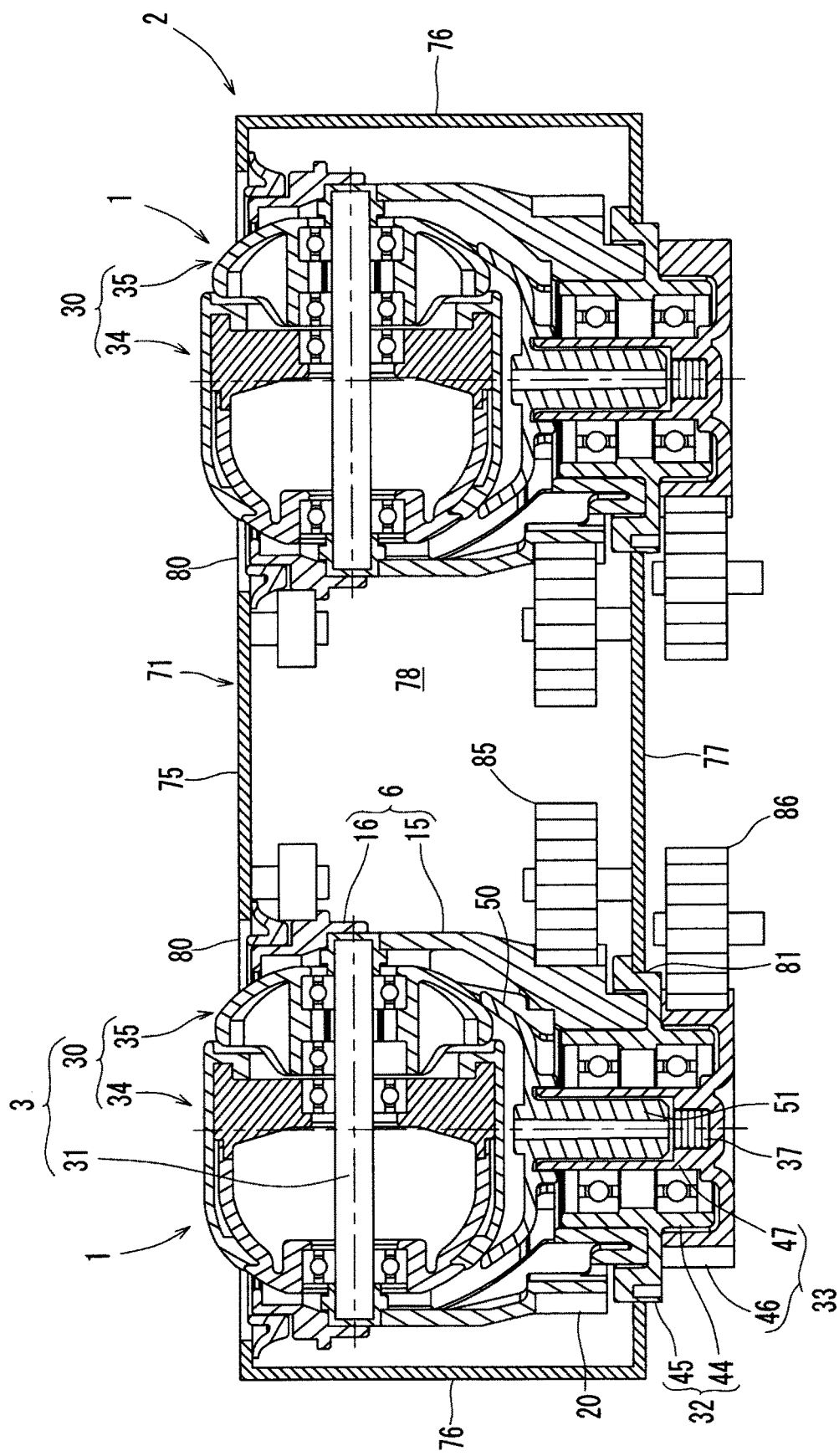
FIG. 8 is a sectional view taken along line A-A of the conveyance direction changing device in FIG. 1.

Specifically, the conveyance direction changing device 2 is configured by a conveyance box 71 (fixing member) and multiple conveyance devices 1. The conveyance box 71 is surrounded by a top plate 75 (flat surface), side plates 76, and a bottom plate 77. A cavity 78 (FIGS. 3 and 8) is formed inside the conveyance box 71.

Figure 3:
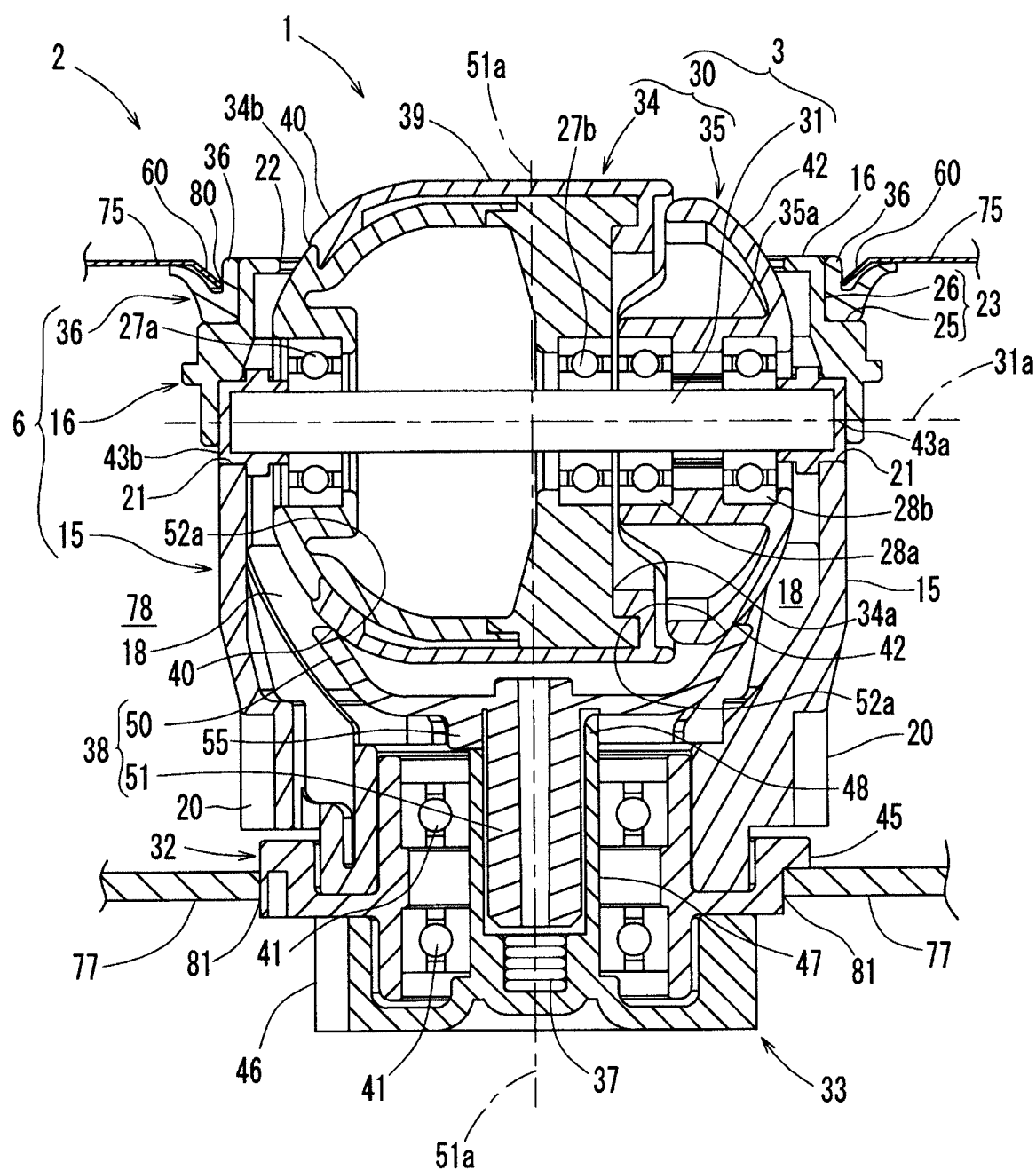
FIG. 3 is a sectional view of the conveyance device in FIGS. 2A and 2B.

As shown in FIG. 1, the top plate 75 configures a flat surface. The top plate 75 is configured by a rigid material (for example, a metal plate such as a stainless-steel plate). The top plate 75 is provided with openings 80 (holes) at equal intervals. As shown in FIG. 3, a hanging portion 60 is provided at an edge of each of the openings 80. The hanging portion 60 is a part formed on the edge of each opening 80, extending downward and radially inward, and inclined in a mortar shape (conical shape). That is, the hanging portion 60 is a part having an annular structure whose inner diameter becomes smaller downward. An opening 81 (FIGS. 3 and 8) is provided at a position immediately below each opening 80 in the bottom plate 77.

At the position of the openings 80 and 81 in the cavity 78 (FIGS. 3 and 8), each conveyance device 1 is disposed. Further, the cavity 78 is provided with a posture changing motor 87 (FIG. 1) and a traveling motor 88 (FIG. 1). As will be described later in detail, the posture changing motor 87 and the traveling motor 88 are power-transmitted to each conveyance device 1.

Figure 2A:
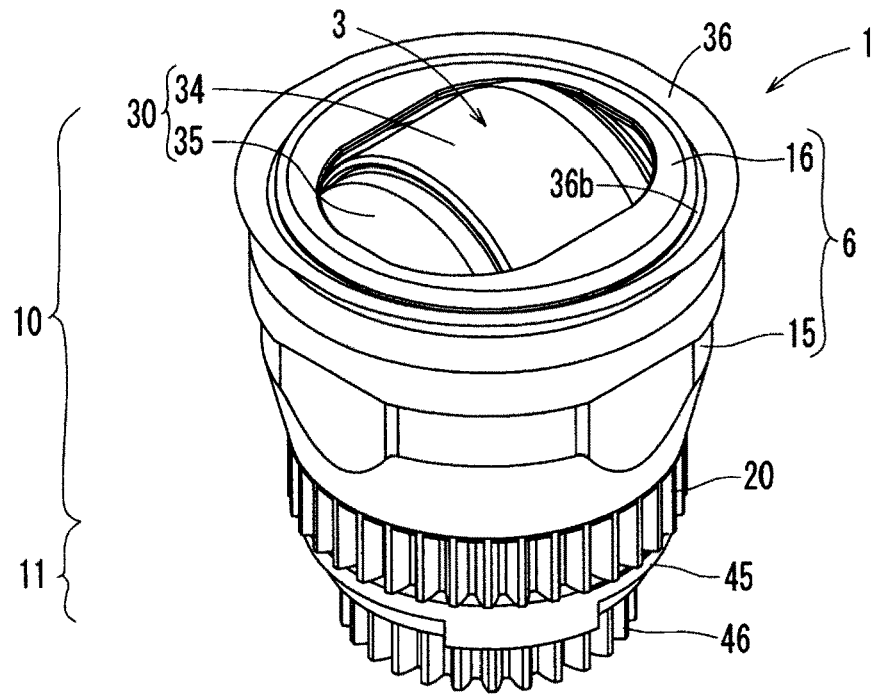
FIGS. 2A and 2B are perspective views of a conveyance device that configures the conveyance direction changing device in FIG. 1, and show a state where a rotatable base is rotated to change an orientation of a rotating body.
Figure 2B:
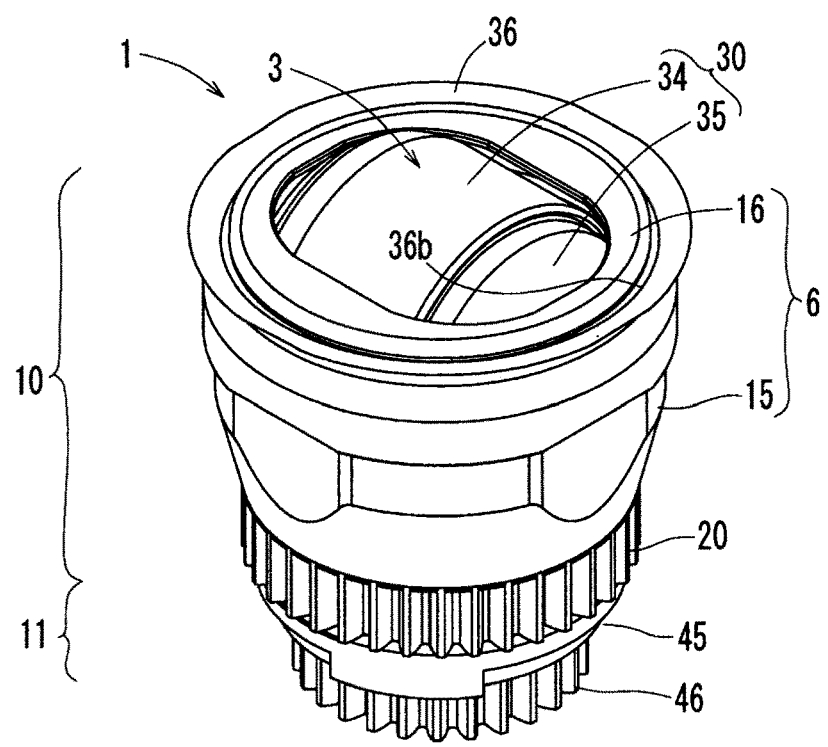
Figure 4:
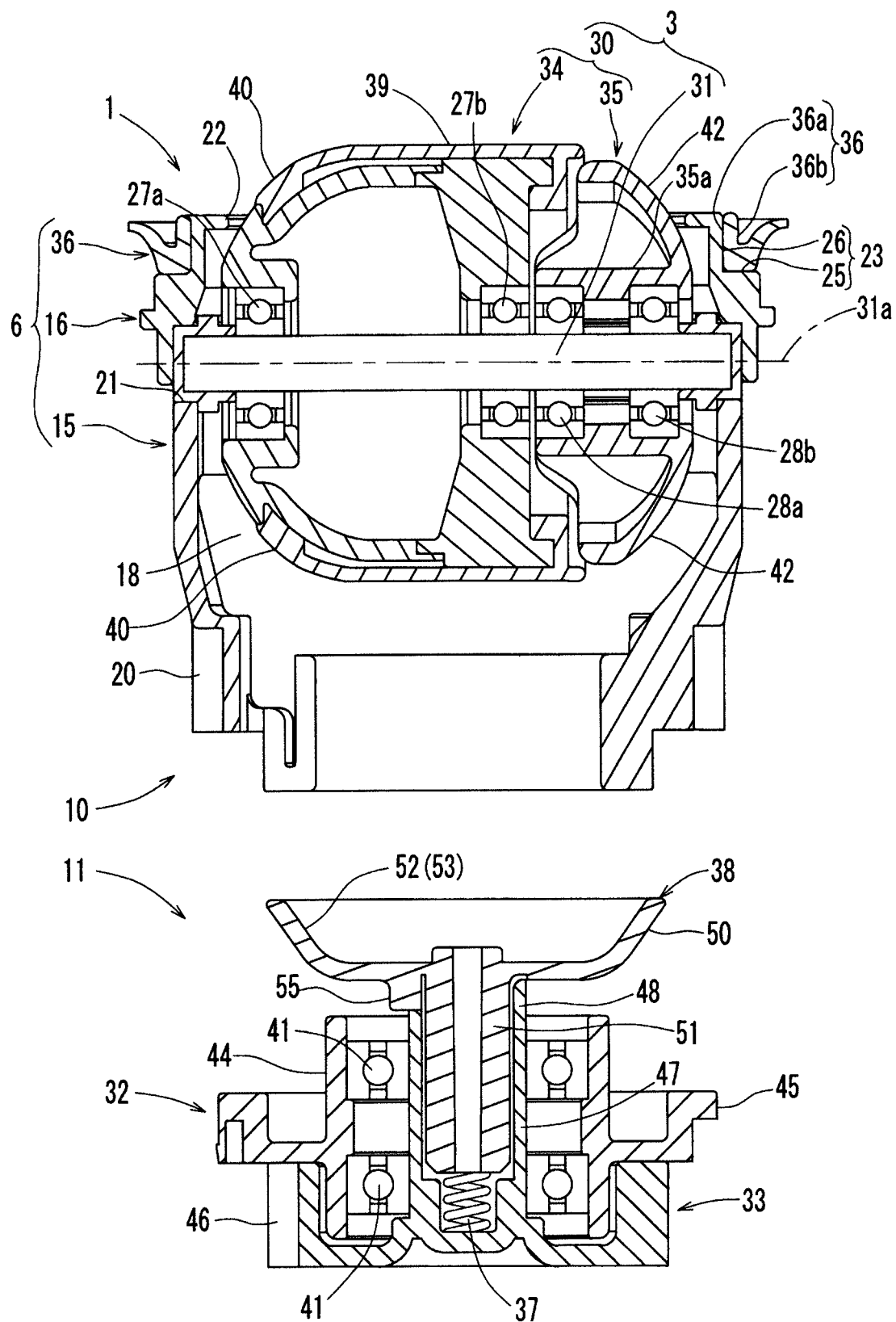
FIG. 4 is a sectional view of the conveyance device in FIGS. 2A and 2B divided into a rotatable base side and a fixed base side.

As shown in FIGS. 2A, 2B, and 4, the conveyance device 1 has a rotatable base side member 10 and a fixed base side member 11, and has a structure in which both members are integrally combined.

As shown in FIGS. 2A, 2B, and 4, the rotatable base side member 10 has a conveyance roller 3 and a rotatable base 6.

As shown in FIG. 3, the conveyance roller 3 has a roller portion 30 (rotating body) and a support shaft 31.

Figure 5:
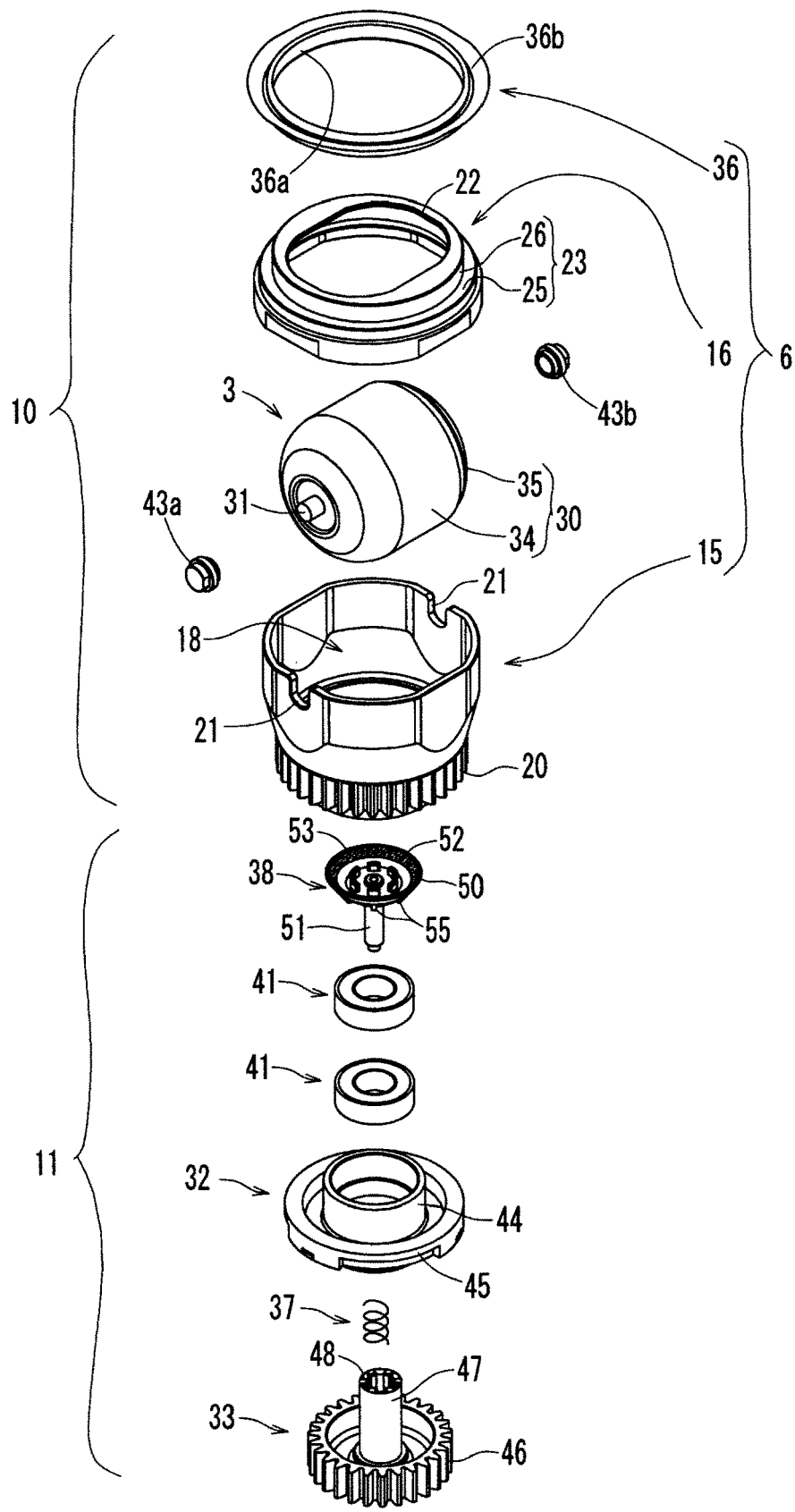
FIG. 5 is an exploded perspective view of the conveyance device in FIGS. 2A and 2B.
Figure 6:
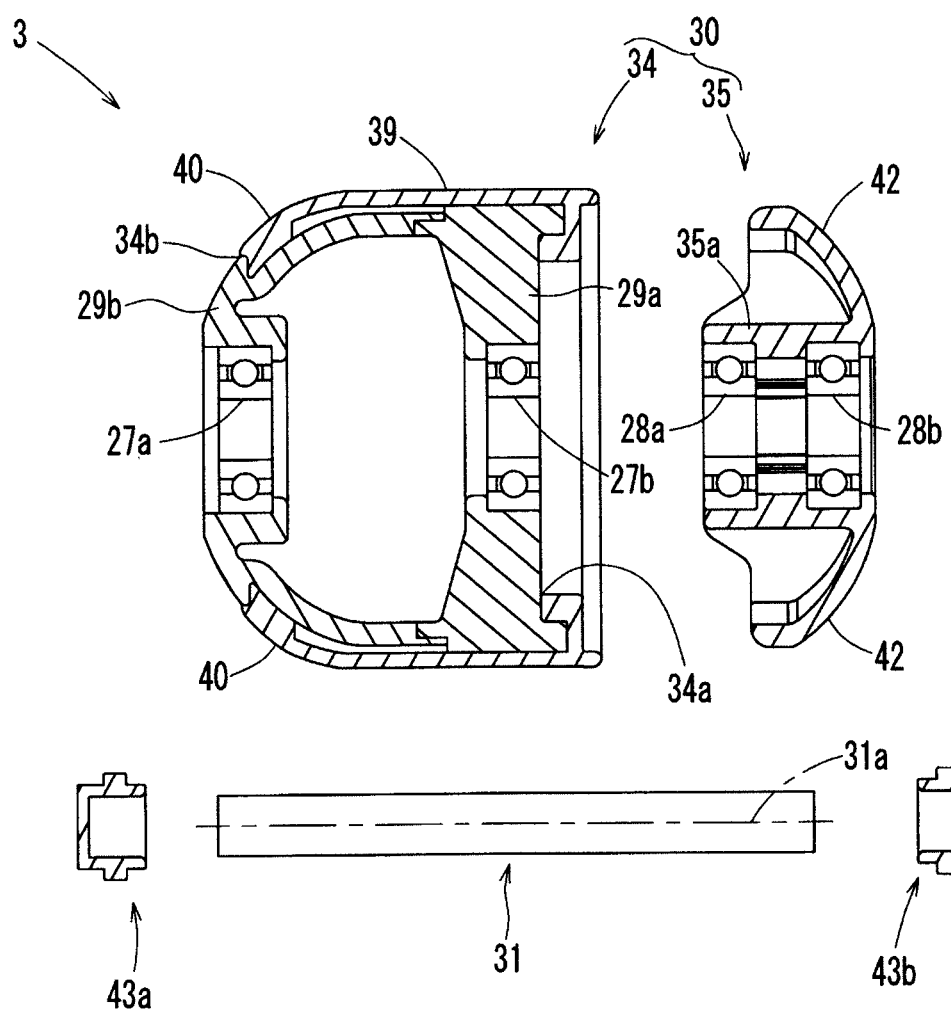
FIG. 6 is an exploded sectional view of a rotating body.

As shown in FIGS. 5 and 6, the roller portion 30 (rotating body) is composed of a main rotating portion 34 and a sub rotating portion 35, and in the present embodiment, an entire shape of the roller portion 30 is a barrel shape similar to a sphere. Here, the "entire shape of the roller portion 30" refers to an outer shape (contour) in which an outer shape of the main rotating portion 34 and an outer shape of the sub rotating portion 35 are continuous (connected), except for a part where the main rotating portion 34 and the sub rotating portion 35 face each other. To be precise, the outer shape of the main rotating portion 34 and the outer shape of the sub rotating portion 35 are discontinuous except for the part where the main rotating portion 34 and the sub rotating portion 35 face each other. However, the entire shape of the roller portion 30 is a shape in which the main rotating portion 34 and the sub rotating portion 35 are considered to be approximately integrated.

The main rotating portion 34 occupies most of an area of the roller portion 30, has a large diameter part (conveyance surface forming portion 39) on one side, and has a small diameter part (power transmission portion 40) on the other side. Further, the main rotating portion 34 has a large diameter opening 34a at a large diameter part and a small diameter opening 34b at a small diameter part. Centers of the two openings 34a and 34b are concentric.

A bearing 27b is provided in the vicinity of the large diameter opening 34a of the main rotating portion 34 via a bearing fixing portion 29a. Further, a bearing 27a is provided in the vicinity of the small diameter opening 34b of the main rotating portion 34 via a bearing fixing portion 29b. Centers of the bearings 27a and 27b coincide with the centers of the openings 34a and 34b of the main rotating portion 34. Further, as shown in FIG. 6, the bearings 27a and 27b are disposed separately on both sides of the main rotating portion 34. As shown in FIG. 4, a common support shaft 31 is inserted into the bearings 27a and 27b. That is, the main rotating portion 34 is rotatable around an axis 31a which is a center line of the support shaft 31. The axis 31a extends horizontally. The main rotating portion 34 is rotatable around the axis 31a of the support shaft 31 as a first rotation axis.

The large diameter part (outer surface) of the main rotating portion 34 configures the conveyance surface forming portion 39 having a cylindrical shape. The conveyance surface forming portion 39 is configured by a cylindrical peripheral surface centering on the support shaft 31 (axis 31a) having a horizontal component, and the objects to be conveyed are placed on an upper end of the conveyance surface forming portion 39 (part at the highest position when rotated).

As shown in FIGS. 3 and 4, the power transmission portion 40 is provided on the small diameter portion of the main rotating portion 34. The power transmission portion 40 is a part that is smoothly continuous with the conveyance surface forming portion 39, has a diameter smaller than that of the conveyance surface forming portion 39, and that a driving body 50 described later comes into contact. In the present embodiment, the power transmission portion 40 is configured as an annular curved surface having a smaller diameter as a distance from the conveyance surface forming portion 39 increases.

Further, the power transmission portion 40 can be locally elastically deformed. That is, when the power transmission portion 40 is pressed, the pressed part is slightly deformed and recessed, and when the pressing is released, the original shape is restored. Thus, when pressed, the contact area with a pressed object (a contact portion 52 or a friction increasing member 53 of the driving body 50 described later) increases, and a frictional force generated between the power transmission portion 40 and the pressed object increases.

Here, the power transmission portion 40 may be configured by a hard material that is not substantially elastically deformed.

The main rotating portion 34 is attached to the support shaft 31 via bearings 27*a* and 27*b*, and the bearings 27*a* and 27*b* are disposed in the vicinity of substantially both ends in an extending direction of a rotation center of the main rotating portion 34. The main rotating portion 34 therefore supports the support shaft 31 stably.

Meanwhile, the sub rotating portion 35 is a part that configures a partial region of the roller portion 30 (rotating body), and is a part that is disposed adjacent to the main rotating portion 34. As shown in FIGS. 3 and 4, a maximum diameter of the sub rotating portion 35 is smaller than a diameter (outer diameter) of the conveyance surface forming portion 39 of the main rotating portion 34.

Further, the sub rotating portion 35 is provided with a power transmission portion 42. The power transmission portion 42 is a part with which the driving body 50 described later contacts. A diameter (outer diameter) of the power transmission portion 42 is equal to a diameter (outer diameter) of the power transmission portion 40 of the main rotating portion 34. In the present embodiment, the power transmission portion 42 is composed of an annular curved surface whose diameter becomes smaller as a distance from the main rotating portion 34 increases, and has a shape that is laterally symmetrical and similar to that of the power transmission portion 40. Similarly to the power transmission portion 40 of the main rotating portion 34, the power transmission portion 42 is preferably configured by a material that is locally elastically deformed. However, the power transmission portion 42 may be configured by a hard material that is not substantially elastically deformed.

Furthermore, a cylindrical bearing fixing portion 35*a* is provided inside the sub rotating portion 35. The bearing fixing portion 35*a* is a cylindrical part extending laterally as viewed in FIG. 3. Bearings 28*a* and 28*b* are provided inside the bearing fixing portion 35*a*. Centers of the bearings 28*a* and 28*b* coincide with the centers of the bearings 27*a* and 27*b*, and the support shaft 31 is inserted into the bearings 28*a* and 28*b*. That is, the sub rotating portion 35 is attached to the support shaft 31 via the bearings 28*a* and 28*b*, and is rotatable around the support shaft 31.

Similarly to the main rotating portion 34, the sub rotating portion 35 is also rotatable around the axis 31*a* which is the center line of the support shaft 31. The sub rotating portion 35 is rotatable around the axis 31*a* of the support shaft 31 as the first rotation axis.

Both the main rotating portion 34 and the sub rotating portion 35 can rotate independently with the axis 31*a* as the first rotation axis. Thus, the sub rotating portion 35 can rotate in a direction different from that of the main rotating portion 34.

The sub rotating portion 35 is attached to the support shaft 31 via bearings 28*a* and 28*b*, and the bearings 28*a* and 28*b* are disposed in the vicinity of substantially both ends in an extending direction of a rotation center of the sub rotating portion 35 (a direction in which the bearing fixing portion 35*a* extends). The sub rotating portion 35 therefore supports the support shaft 31 stably.

As shown in FIG. 3, the power transmission portion 40 of the main rotating portion 34 and the power transmission portion 42 of the sub rotating portion 35 are disposed at positions substantially laterally symmetrical with respect to an axis 51*a* (second and third rotation axes) as a vertical line described later, and the outer diameters of the power transmission portion 40 and the outer diameter of the power transmission portion 42 coincide with each other. Further, both the main rotating portion 34 and the sub rotating portion 35 are attached to the support shaft 31, but the main rotating portion 34 and the sub rotating portion 35 are not in contact with each other and are rotatable independently without interfering with each other.

The support shaft 31 penetrates the main rotating portion 34 and the sub rotating portion 35 as described above. Further, shaft spacers 43*a* and 43*b* are attached to both ends of the support shaft 31. Both ends of the support shaft 31 are fixed to notches 21 (FIG. 5) of a roller receiving cup 15 (support member) described later via the shaft spacers 43*a* and 43*b*. The shaft spacers 43*a* and 43*b* are bottomed and have a hole having an inner diameter that suitably accommodates each end of the support shaft 31. Further, the shaft spacers 43*a* and 43*b* have a shape that can be suitably fitted into each notch 21 (FIG. 5).

Next, the rotatable base 6 of the rotatable base side member 10 will be described.

As shown in FIG. 5, the rotatable base 6 includes the roller receiving cup 15 (support member), a pressing member 16, and a slide bush 36.

The roller receiving cup 15 is a cylindrical body including an upper portion having a large volume and a lower portion having a slightly narrowed shape. The roller receiving cup 15 functions as a support member that rotatably supports the roller portion 30 (rotating body).

The roller receiving cup 15 has openings at the upper portion and the lower portion. The inside of the roller receiving cup 15 penetrates so as to connect the upper and lower openings. The upper portion of the roller receiving cup 15 functions as a roller accommodating portion 18 that accommodates the roller portion 30 (rotating body) of the conveyance roller 3, and the inside of the roller receiving cup 15 is hollow.

An upper end of the roller receiving cup 15 is open. As shown in FIG. 5, the notches 21 are provided at two opposing positions on a side wall of the roller receiving cup 15. Both ends of the support shaft 31 of the conveyance roller 3 are engaged with the notches 21 via the shaft spacers 43*a* and 43*b*. That is, the notches 21 have a function of fixing the support shaft 31 of the conveyance roller 3 so as not to rotate.

A gear 20 (second power transmission member) is carved on an outer periphery of the lower portion of the roller receiving cup 15 as shown in FIG. 5. The gear 20 is integrally formed around the roller receiving cup 15, and when power is supplied to the gear 20, the entire roller receiving cup 15 rotates around the axis 51a (vertical axis and third rotation axis) shown in FIG. 3. That is, the support shaft 31 whose both ends are supported by the opposing notches 21 of the roller receiving cup 15 and the roller portion 30 (the main rotating portion 34 and the sub rotating portion 35) accommodated in the roller accommodating portion 18 of the roller receiving cup 15 rotate integrally with the roller receiving cup 15 around the axis 51a (vertical axis) as the third rotation axis.

The pressing member 16 is a member that functions as a lid corresponding to the opening at the upper portion of the roller receiving cup 15. An opening 22 is provided at a center of the pressing member 16. An inner diameter of the opening 22 is smaller than a diameter of the roller portion 30, but is large enough to allow a part (upper portion) of the roller portion 30 to protrude outside from the roller accommodating portion 18.

An annular step portion 23 is provided on an outer periphery of the pressing member 16 as shown in FIGS. 3, 4, and 5. That is, a horizontal wall portion 25 and a vertical wall portion 26 are provided at an upper end of the outer periphery of the pressing member 16. The slide bush 36 is attached to the step portion 23.

The slide bush 36 is a member having an annular structure including a material having a relatively small friction coefficient and excellent wear resistance. As shown in FIGS. 4 and 5, the slide bush 36 has an attachment portion 36a and a friction engagement portion 36b.

The attachment portion 36a is a part attached to the step portion 23 of the pressing member 16. That is, the attachment portion 36a is in contact with (presses) the horizontal wall portion 25 and the vertical wall portion 26 of the step portion 23, and the slide bush 36 is fixed to the pressing member 16. The slide bush 36 is therefore integrated with the pressing member 16.

Figure 11A:
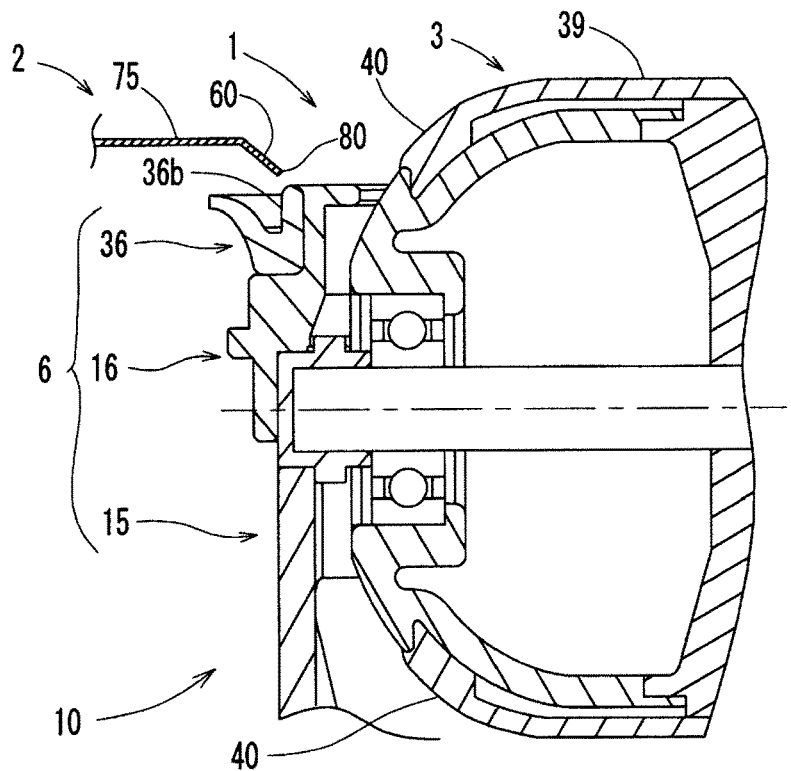
Figure 11B:
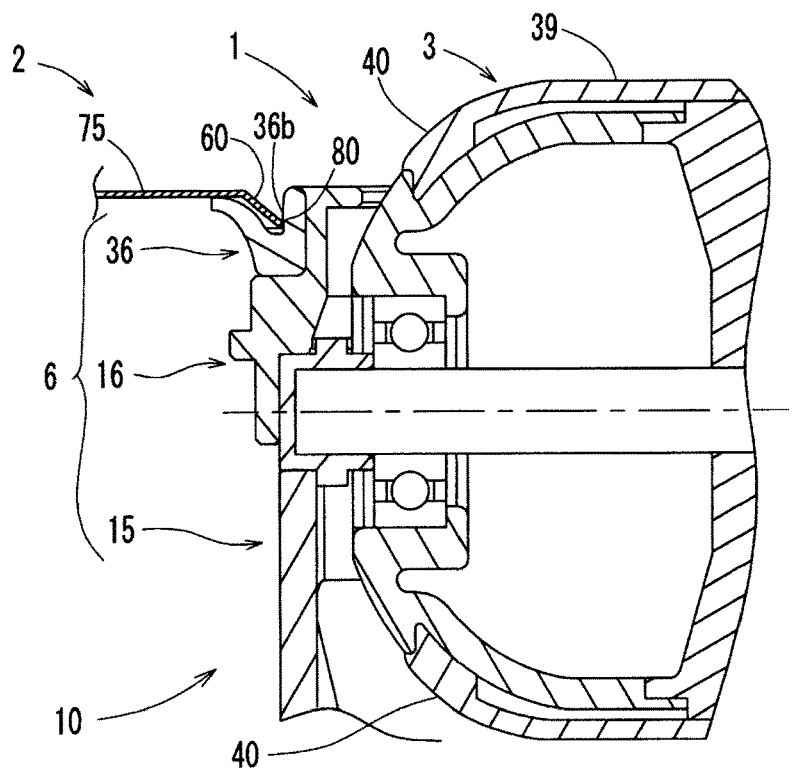

As shown in FIGS. 3, 5, and 11A, the friction engagement portion 36b configures an annular groove. Further, as shown in FIG. 11B, the friction engagement portion 36b is engaged with the hanging portion 60 of each opening 80 of the top plate 75 of the conveyance box 71 (FIG. 1). That is, the hanging portion 60 is engaged with an entire circumference of the friction engagement portion 36b configuring the annular groove. The friction engagement portion 36b (rotatable base 6) is capable of rotating relative to the hanging portion 60 (top plate 75). That is, when the friction engagement portion 36b slides on each opening 80 (hanging portion 60), the rotatable base 6 can rotate relative to the top plate 75. The top plate 75 (opening 80) supports the rotatable base 6 stably because the annular hanging portion 60 (top plate 75) is engaged with the friction engagement portion 36b (rotatable base 6) as the annular groove. The rotatable base 6 rotates around the vertical axis stably.

In the present embodiment, no bearing is needed to attach the conveyance roller 3 (rotatable base 6) to the top plate 75. That is, the conveyance roller 3 can be attached to each opening 80 of the top plate 75 only by engaging the annular hanging portion 60 (top plate 75) with the friction engagement portion 36b (rotatable base 6) as the annular groove. This significantly simplifies attachment of the conveyance roller 3 to the top plate 75. The hanging portion 60 functions as a guide for rotation around the axis 51a of the rotatable base 6.

The conveyance surface forming portion 39 of the main rotating portion 34 protrudes upward through each opening 80 of the top plate 75 (flat surface), and can place and convey the objects to be conveyed.

Figure 12A:
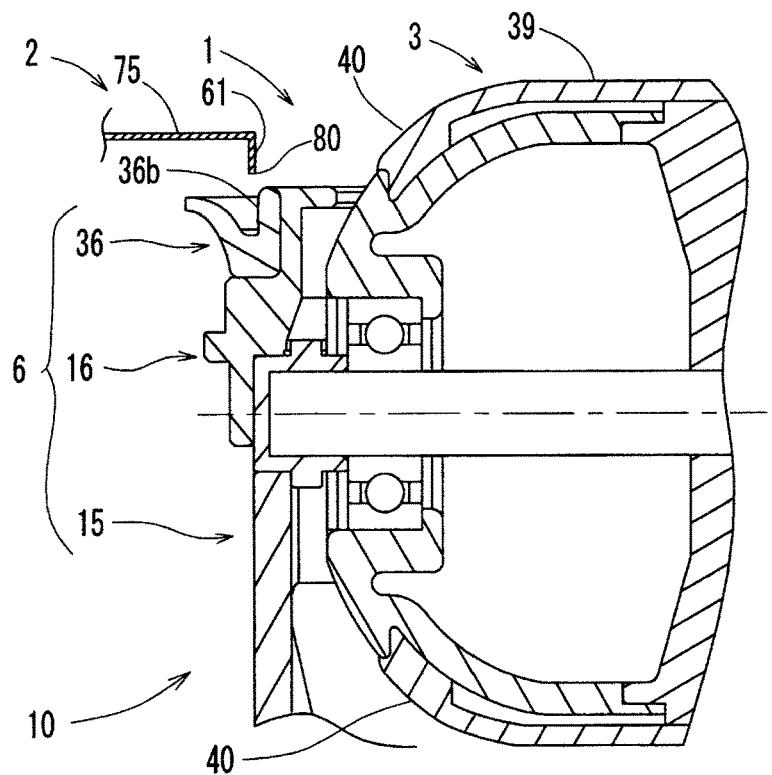
Figure 12B:
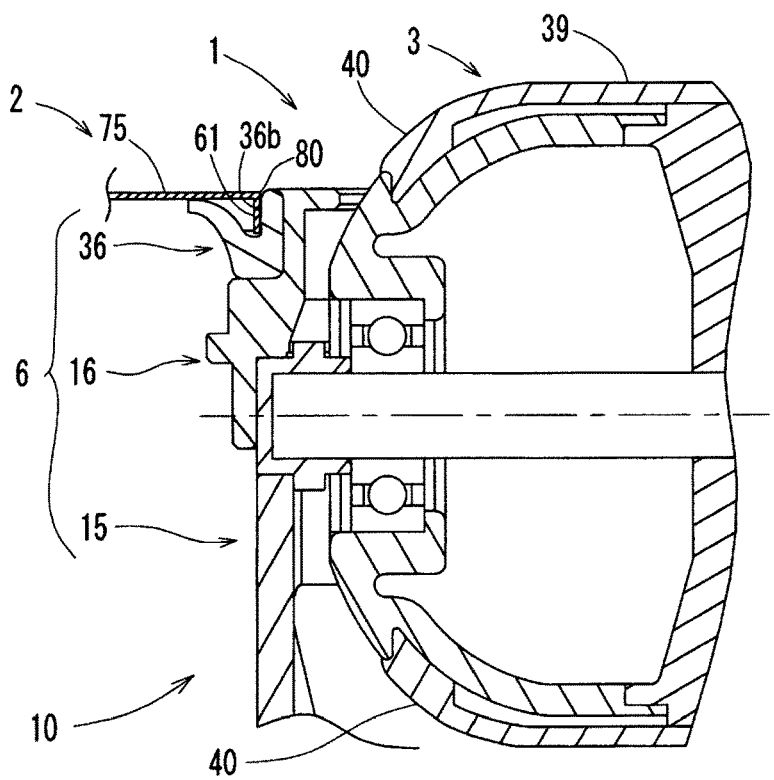

The hanging portion 60 is not limited to the mortar shape, but may have a cylindrical shape that faces vertically downward. For example, as shown in FIGS. 12A and 12B, a cylindrical hanging portion 61 may be provided at each opening 80 of the top plate 75. The hanging portion 61 is a cylindrical part having a vertical posture, and can be formed by burring each opening 80.

Further, the hanging portion 60 (61) is configured by processing the edge of the opening 80 (hole) of the top plate 75 in the present embodiment. However, the hanging portion 60 may be configured by a member different from the top plate 75 and attached to each opening 80.

A structure in which the hanging portion 60 (61) provided on the edge of the opening 80 of the top plate 75 is engaged with the friction engagement portion 36b (annular groove) of the slide bush 36 attached to the roller receiving cup 15 (configuration requiring no bearing) can be adopted not only when the main rotating portion 34 and the sub rotating portion 35 are provided as in the conveyance roller 3 (rotating body) according to the present embodiment, but also when the rotating body is integrally structured as a whole (for example, a sphere or a roller (short body)).

Next, the fixed base side member 11 will be described.

As shown in FIGS. 4 and 5, the fixed base side member 11 is composed of a lower lid member 32, a power transmission member 33, a driving member 38, a spring 37, and bearings 41.

The lower lid member 32 has a cylindrical portion 44 and a flange portion 45. The cylindrical portion 44 is provided in a center of the lower lid member 32, and the flange portion 45 is provided around the cylindrical portion 44. The flange portion 45 is provided at a substantially intermediate position in an axial direction (longitudinal direction) of the cylindrical portion 44. The cylindrical portion 44 and the flange portion 45 are continuous over an entire circumference. The cylindrical portion 44 penetrates in the axial direction (vertical direction).

The power transmission member 33 (first power transmission member) is provided with a gear portion 46 around one end (lower side), and has a structure in which a power transmission shaft 47 protrudes from a center of the gear portion 46. The power transmission shaft 47 is a bottomed cylinder having a small diameter. That is, an upper end of the power transmission shaft 47 is open, but a lower end of the power transmission shaft 47 is closed. An engagement portion 48 is provided at an edge of a tip (upper end) of the power transmission shaft 47. The engagement portion 48 is a part where a part of the cylinder is cut out to be uneven. That is, the engagement portions 48 are disposed annularly at equal intervals.

Figure 7A:
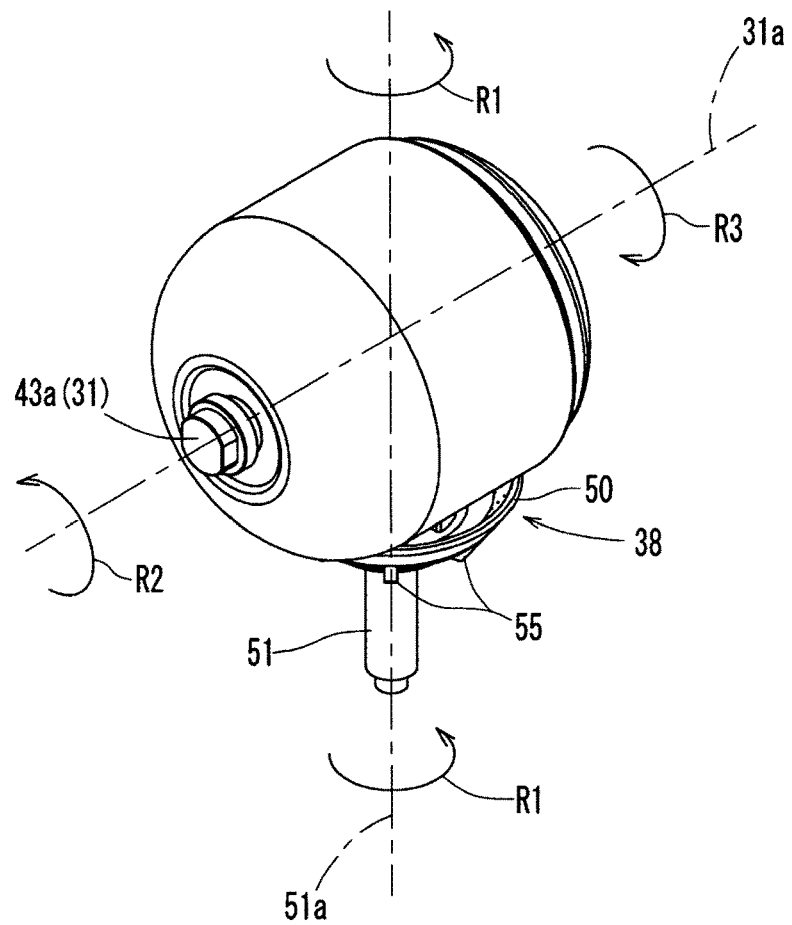
FIG. 7A is a perspective view showing a concept of the rotating body and a driving body of the conveyance device in FIGS. 2A and 2B.
Figure 7B:
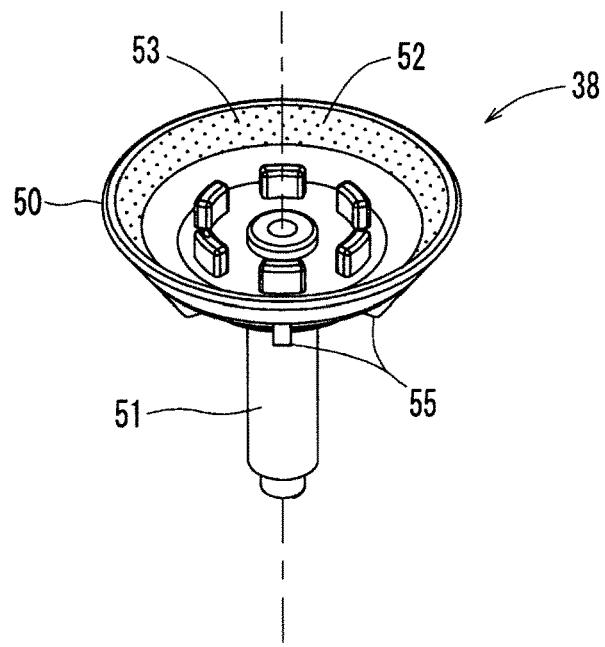
FIG. 7B is a perspective view of the driving body.

As shown in FIGS. 5 and 7, the driving member 38 is composed of the driving body 50 and a rotation shaft 51. The driving body 50 has a dish-like appearance, and is provided with a tapered contact portion 52 on an inner surface thereof. That is, a part of the driving body 50 on the inner surface of the dish configures the contact portion 52. The friction increasing member 53 is attached to the contact portion 52.

Similarly to the power transmission portion 40 of the main rotating portion 34 and the power transmission portion 42 of the sub rotating portion 35, the contact portion 52 may be configured by such a material that the pressed part is locally recessed and elastically deformed, or may be configured by a hard material that is hardly elastically deformed.

The rotation shaft 51 is provided on a reverse surface (lower surface of the dish) of the driving body 50 so as to vertically extend. That is, an upper end of the rotation shaft 51 is fixed to the lower surface of the driving body 50, and the rotation shaft 51 hangs from the lower surface of the driving body 50. The axis 51a as a center line of the rotation shaft 51 is a vertical line, and the rotation shaft 51 functions as a rotation shaft that changes an orientation of the roller portion 30 (support shaft 31) of the conveyance roller 3. The axis 51a of the rotation shaft 51 intersects (crosses orthogonally) with the axis 31a of the support shaft 31.

Further, a plurality of engagement portions 55 is provided on the reverse surface (lower surface) of the driving body 50. Each engagement portion 55 is a protruding part that protrudes downward, and is provided at an equal interval in a circumferential direction of the driving body 50.

The bearings 41 are disposed between an inner peripheral surface of the cylindrical portion 44 of the lower lid member 32 and an outer peripheral surface of the power transmission shaft 47 of the power transmission member 33, and rotatably connect the lower lid member 32 and the power transmission member 33. That is, as shown in FIGS. 3 and 4, in the fixed base side member 11, the power transmission shaft 47 of the power transmission member 33 is inserted into the cylindrical portion 44 of the lower lid member 32 via the bearings 41. In the present embodiment, the two bearings 41 are disposed between the cylindrical portion 44 and the power transmission shaft 47 in upper and lower stages.

The spring 37 is a compression spring and is disposed inside the cylindrical power transmission shaft 47 of the power transmission member 33. That is, the spring 37 is disposed at the lower end inside the power transmission shaft 47 having a bottomed cylindrical shape.

Further, the rotation shaft 51 of the driving member 38 is inserted into the power transmission shaft 47. The center of the rotation shaft 51 of the driving member 38 coincides with a center of the power transmission shaft 47.

The lower end of the spring 37 is in contact with a bottom surface (lower end) of the power transmission shaft 47 having a bottomed cylindrical shape, and the upper end of the power transmission shaft 47 is in contact with a lower portion of the rotation shaft 51 of the driving member 38. The rotation shaft 51 is therefore biased upward by the spring 37.

Further, the engagement portion 48 of the power transmission shaft 47 of the power transmission member 33 and the engagement portion 55 of the driving body 50 of the driving member 38 are engaged. As a result, the power transmission shaft 47 and the rotation shaft 51 are allowed to move relative to each other in a vertical axis direction, but are integrated in a rotation direction. That is, the power transmission member 33 and the driving member 38 rotate integrally.

The power transmission member 33 can smoothly rotate relative to the cylindrical portion 44 of the lower lid member 32 because the power transmission member 33 is attached to the cylindrical portion 44 of the lower lid member 32 via the bearings 41. The power transmission shaft 47 of the power transmission member 33 is fixed by a retaining member (not shown) so as to be unmovable in the axial direction with respect to the cylindrical portion 44 of the lower lid member 32. Thus, the power transmission member 33 is attached to the lower lid member 32 so as to be rotatable but unremovable.

The driving member 38 is attached to the power transmission member 33 to be relatively unrotatable, and thus when power of the traveling motor 88 (FIG. 1) is transmitted to the gear portion (first power transmission member) 46 of the power transmission member 33 via the gear 86 (FIG. 8) to rotate the power transmission member 33, the driving member 38 synchronously rotates. That is, when the power transmission member 33 (gear portion 46) rotates, the driving body 50 also rotates around the axis 51a of the rotation shaft 51.

In the present embodiment, the driving body 50 has the axis 51a as the second rotation axis, and is rotated by power around the second rotation axis. The second rotation axis and the third rotation axis are identical in the present embodiment, but may be different.

Next, operations of each conveyance device 1 (conveyance direction changing device 2) will be described.

In each conveyance device 1 assembled as shown in FIG. 3, the lower lid member 32 of the fixed base side member 11 (FIG. 5) and the pressing member 16 (slide bush 36) of the rotatable base side member 10 are fixed to a fixed structure such as the conveyance box 71 shown in FIG. 1. A plurality of the conveyance devices 1 is attached to the conveyance box 71 to configure the conveyance direction changing device 2. The rotatable base 6 (slide bush 36) of each conveyance device 1 can be attached to the hanging portion 60 of the conveyance box 71 with a single touch. The assembling is therefore significantly easy, and the plurality of conveyance devices 1 (rotatable base 6) can be quickly attached to the conveyance box 71.

In this state, when the power transmission member 33 (gear portion 46) receives power from the traveling motor 88 (FIG. 1), the power transmission member 33 rotates. Here, the engagement portion 48 of the power transmission shaft 47 of the power transmission member 33 is engaged with the engagement portion 55 of the driving body 50, and thus the driving body 50 rotates simultaneously with the power transmission member 33. The driving body 50 rotates around the axis 51a of the rotation shaft 51.

As shown in FIG. 3, the contact portion 52 of the driving body 50 is in contact with both the power transmission portion 40 of the main rotating portion 34 and the power transmission portion 42 of the sub rotating portion 35. That is, a left part on the circumference of the driving body 50 (contact portion 52) as viewed in FIG. 3 is in contact with the power transmission portion 40 of the main rotating portion 34, and a right part on the circumference of the driving body 50 (contact portion 52) is in contact with the power transmission portion 42 of the sub rotating portion 35. In other words, the power transmission portions 40 and 42 are in contact with the opposing parts on the circumference of the contact portion 52 of the driving body 50.

The contact between the driving body 50 (contact portion 52) and the power transmission portion 40 of the main rotating portion 34 is a substantially point contact. The main rotating portion 34 is in contact with the driving body 50 at a lowermost position of the annular power transmission portion 40, and the other parts of the main rotating portion 34 are substantially not in contact with the driving body 50. Similarly, the sub rotating portion 35 is in contact with the driving body 50 at a lowermost position of the annular power transmission portion 42, and the other parts of the sub rotating portion 35 are substantially not in contact with the driving body 50. Then, the driving body 50 presses the main rotating portion 34 and the sub rotating portion 35 upward substantially equally by a biasing force of the spring 37. That is, the upward biasing force of the spring 37 acts in a well-balanced manner on both left and right sides (both sides of the axis 51a) of the entire roller portion 30 (main rotating portion 34 and sub rotating portion 35).

Further, when the contact portion 52 and the power transmission portions 40 and 42, which are configured by a material that is substantially locally elastically deformed, are elastically deformed when pressed against each other, thereby increasing the contact area and the acting frictional force. Therefore, power is reliably transmitted.

Alternatively, the contact portion 52 and the power transmission portions 40 and 42 can be configured by a hard material that is not locally elastically deformed.

Further, gears may be formed in the contact portion 52 and the power transmission portions 40 and 42, and the power may be transmitted by meshing the gears.

The support shaft 31 stably supports the main rotating portion 34 by the bearings 27a and 27b provided separately on both the left and right sides of the main rotating portion 34 as viewed in FIG. 3. Similarly, the support shaft 31 stably supports the sub rotating portion 35 by the bearings 28a and 28b provided on both the left and right sides of the sub rotating portion 35 as viewed in FIG. 3.

Then, an upward force acting on the support shaft 31 from the driving body 50 (biasing force of the spring 37) is transmitted from the main rotating portion 34 via the bearings 27a and 27b, and from the sub rotating portion 35 via the bearing 28a and 28b.

Here, the roller portion 30 is configured such that a center of gravity of the entire roller portion 30 is located at a center of the support shaft 31 supported at both ends in a direction of the axis 31a. Further, the axis 51a (second and third rotating axes) of the rotation shaft 51 passes through an intermediate point of the notches 21 facing each other in the roller receiving cup 15. That is, the center of gravity of the entire roller portion 30 is on the axis 51a.

A material of the main rotating portion 34 and a material of the sub rotating portion 35 can be different. For example, both the main rotating portion 34 and the sub rotating portion 35 do not have to be formed with an expensive material, but either the main rotating portion 34 or the sub rotating portion 35 may be formed with an inexpensive material ensuring necessary performance (wear resistance and the like).

When the driving body 50 rotates in a direction R1 shown in FIG. 7A around the axis 51a of the vertical rotation shaft 51 in a vertical posture, the power (rotational force) is transmitted from the driving body 50 to the main rotating portion 34 (power transmission portion 40), and the main rotating portion 34 rotates in a direction R2 around the axis (first rotation axis) 31a of the support shaft 31 in a horizontal posture. Further, at this time, the power (rotational force) is transmitted from the driving body 50 to the sub rotating portion 35 (power transmission portion 42), and the sub rotating portion 35 also rotates in a direction R3 around the axis (first rotation axis) 31a of the support shaft 31.

That is, the rotation direction R3 of the sub rotating portion 35 is opposite to the rotation direction R2 of the main rotating portion 34. The main rotating portion 34 and the sub rotating portion 35, which are not in contact with each other, rotate independently in the opposite directions without interfering with each other.

The main rotating portion 34 and the sub rotating portion 35, which are supported by the support shaft 31 via the bearings 27a, 27b, 28a, and 28b, rotate smoothly when receiving the power. That is, the main rotating portion 34 and the sub rotating portion 35 rotate stably.

When an object to be conveyed is placed on the conveyance surface forming portion 39 of the main rotating portion 34 configuring a conveyance surface, the object is biased by the rotating conveyance surface forming portion 39 and conveyed in the rotation direction (biasing direction). The sub rotating portion 35 does not contact the object to be conveyed because the sub rotating portion 35 has a smaller diameter than that of the main rotating portion 34.

When the object to be conveyed is placed on the conveyance surface forming portion 39 of the main rotating portion 34, a weight of the object acts on the support shaft 31 via the main rotating portion 34 and the bearings 27a and 27b. Both ends of the support shaft 31 are supported by both notches 21 of the roller receiving cup 15 that are equidistant from the rotation shaft 51. Further, the support shaft 31 receives an upward biasing force from the driving member 38 via the power transmission portion 40 of the main rotating portion 34 and the power transmission portion 42 of the sub rotating portion 35 that are equidistant from the rotation shaft 51. Therefore, each conveyance device 1 can favorably support the object to be conveyed, and the roller portion 30 (the main rotating portion 34 and the sub rotating portion 35) can smoothly rotate to convey the object.

The power (rotational force) is transmitted from the traveling motor 88 to the gear portion 46 via the gear 86 (FIG. 8), and the roller portion 30 (main rotating portion 34 and sub rotating portion 35) of each conveyance device 1 synchronously rotates. That is, the object is conveyed by receiving a biasing force of a similar magnitude in the same direction from each conveyance device 1 (conveyance surface forming portion 39).

Figure 9:
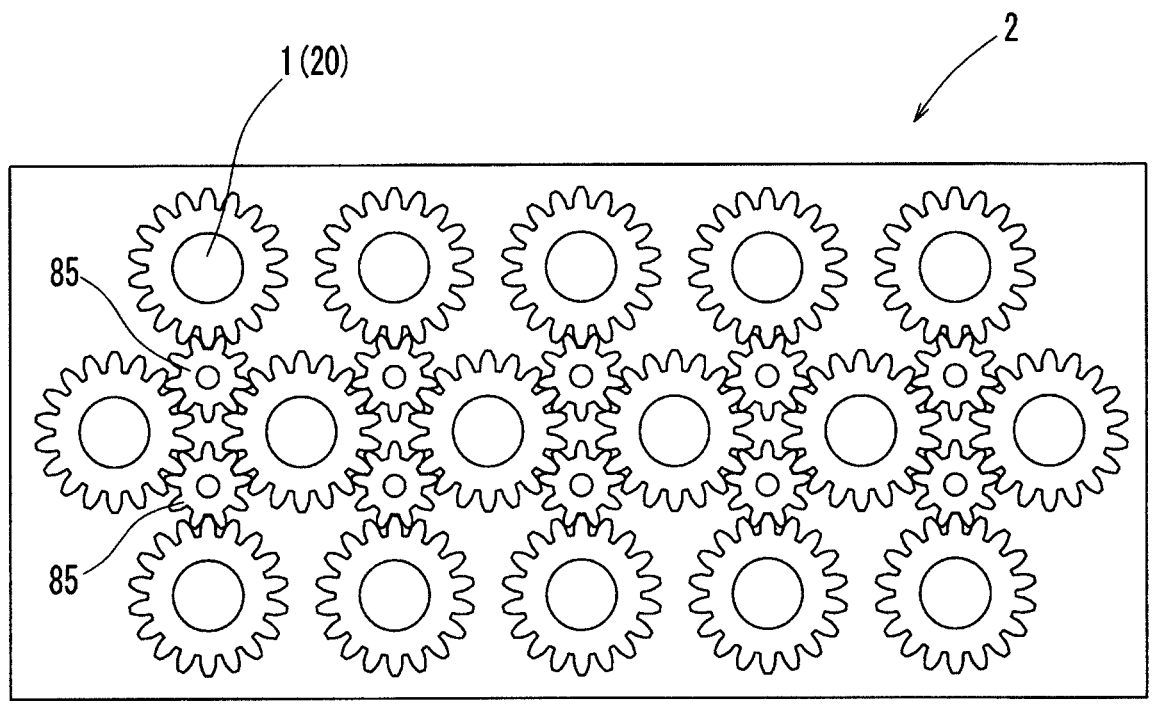
FIG. 9 is a sectional plan view of the conveyance direction changing device in FIG. 1, showing a relationship between a rotation driving gear and an idle gear of the conveyance device.

When a conveyance direction of the object to be conveyed is changed, the power is transmitted from the posture changing motor 87 (FIG. 1) to the gear 20 (second power transmission member) of the roller receiving cup 15 through an idle gear 85 (FIGS. 8 and 9), and the roller receiving cup 15 rotates together with the support shaft 31 by a predetermined angle as shown in FIGS. 2A and 2B.

Figure 10A:
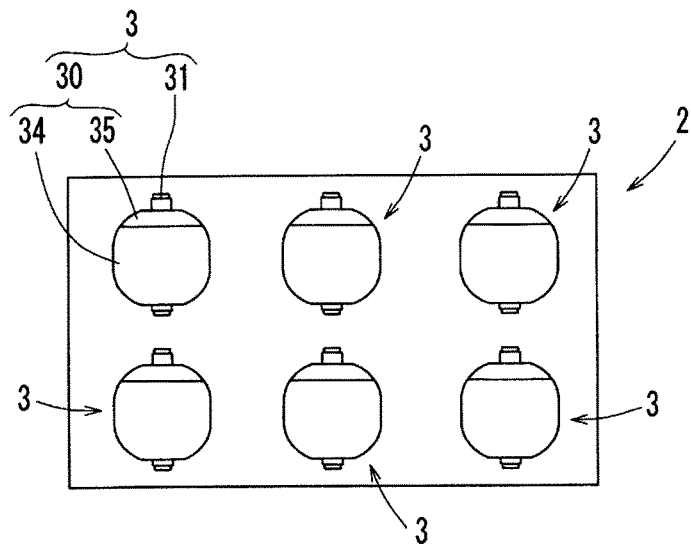
FIGS. 10A to 10C are plan views showing operations of the conveyance direction changing device in FIG. 1.
Figure 10B:
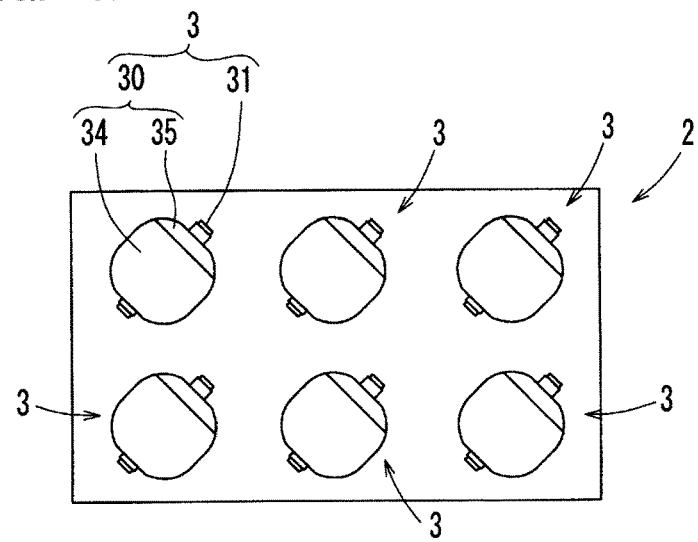
Figure 10C:
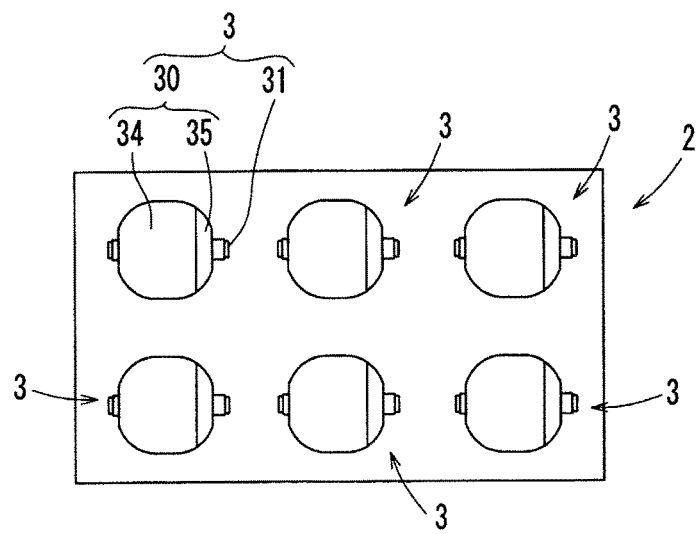

When the posture changing motor 87 (FIG. 1) is operated, the roller portion 30 of each conveyance device 1 changes an orientation all at once, as shown in FIGS. 10A to 10C. That is, the conveyance direction changing device 2 can simultaneously change an orientation of the main rotating portion 34 (conveyance surface forming portion 39) of each conveyance device 1, and the object to be conveyed is conveyed in any desired direction.

Multiple conveyance devices 1 described above are disposed in conveyance box 71 as shown in FIG. 1 to configure the conveyance direction changing device 2. From each opening 80 of the top plate 75 of the conveyance box 71, a part of the conveyance roller 3 (roller portion 30) of each conveyance device 1 (conveyance surface forming portion 39) is exposed. The orientation of the conveyance surface forming portion 39 of each conveyance device 1 is the same. That is, each conveyance devices 1 can convey the object to be conveyed by biasing the object in the same direction.

When the power (rotational force) is transmitted from the posture changing motor 87 to the gear 20 of each conveyance device 1 via the idle gear 85 provided on the side plate 76, the roller portion 30 (main rotating portion 34 and sub rotating portion 35) of each conveyance device 1 changes the posture (orientation) synchronously.

Operations of the traveling motor 88 and the posture changing motor 87 are controlled by a controller (not shown). The object to be conveyed (not shown) is provided with an information recording portion in which a destination is recorded. A sensor (not shown) reads the information recorded in the information recording portion, the read information is sent to the controller, and the controller controls the operations of the traveling motor 88 and the posture changing motor 87 such that the object can be conveyed to the destination according to the object.

The gear 20 is adopted as the second power transmission member in the present embodiment. Alternatively, another power transmission means (for example, chain, belt, or friction) can be adopted on an assumption that each rotatable base side member 10 (FIGS. 2A and 4) rotates synchronously.

In the present embodiment, the entire shape of the roller portion 30 (rotating body) (shape of the entire outer appearance of the main rotating portion 34 and the sub rotating portion 35 as viewed from outside) is a barrel shape close to a sphere, but may be spherical or cylindrical.

The hanging portion 60 (61) of each opening 80 (hole) of the top plate 75 (flat surface) preferably has an annular structure, but a plurality of protruding pieces may be disposed annularly. For example, instead of the hanging portion 60, the protruding pieces are disposed radially inward from the edge of each opening 80 and obliquely downward. That is, the protruding pieces may be disposed on an upper surface of the mortar (on the conical surface that protrudes downward). Then, the protruding pieces annularly disposed are engaged with the friction engagement portion 36b (engagement portion) of the slide bush 36 of the roller receiving cup 15 (support member).

In the present embodiment, an example has been described in which each conveyance device 1 is provided with the conveyance roller 3 (rotating body configured into a sphere by the main rotating portion 34 and the sub rotating portion 35) as a biasing member that biases and conveys the object to be conveyed. Alternatively, a rotating body such as a sphere or a roller (short roller) having an integrated structure, or a traveling body such as an annular belt or an annular chain can be used as the biasing member instead of the conveyance roller 3. Specifically, the conveyance device disclosed in WO2016/208736 (hereinafter referred to as No. 736) filed by the applicant can be improved to be the conveyance device of the present invention.

Figure 13A:
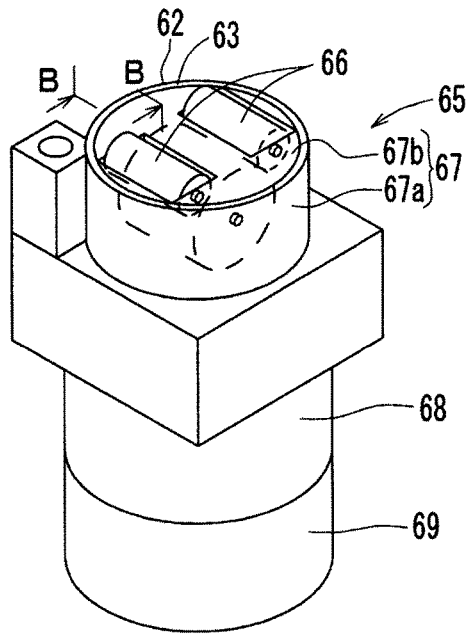
FIG. 13A is a perspective view of a conveyance device according to another embodiment.
Figure 13C:
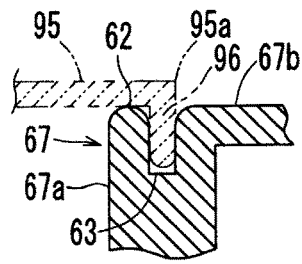
FIG. 13C is a sectional view taken along line B-B in FIG. 13A.
Figure 13B:
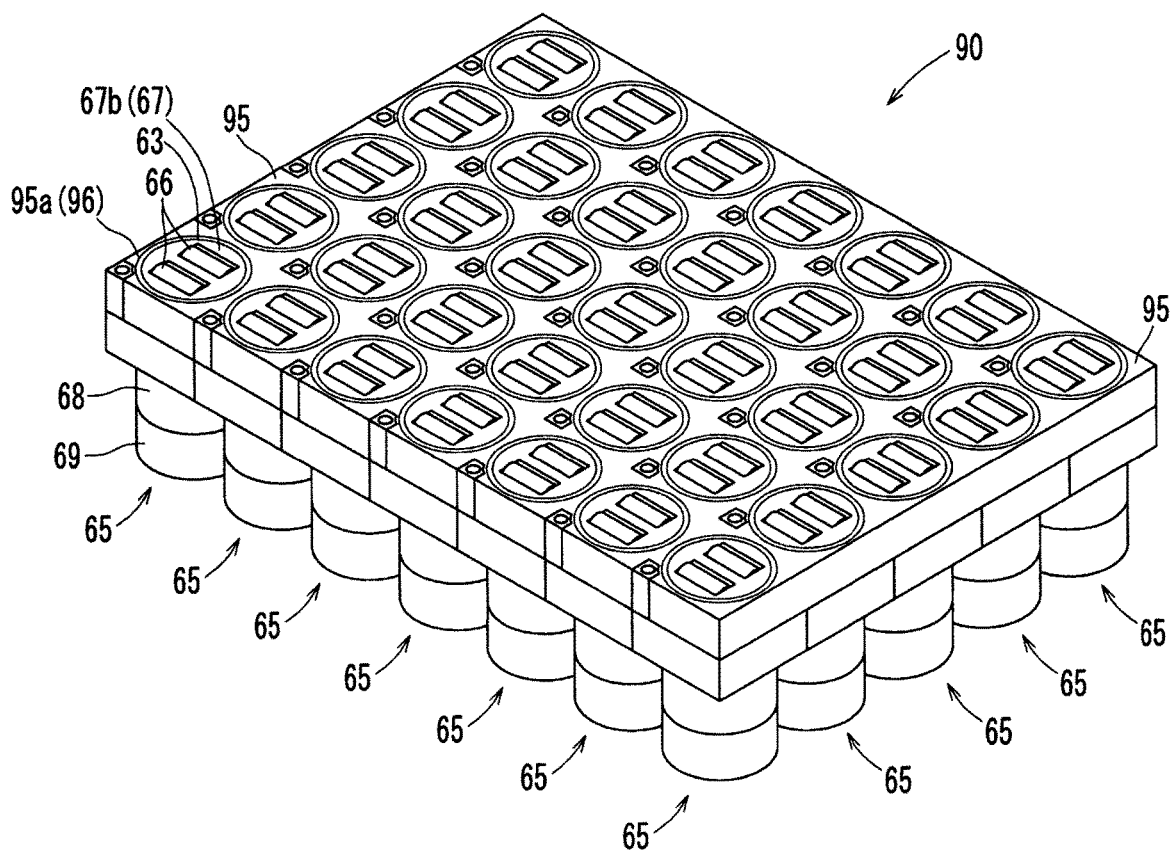
FIG. 13B is a perspective view of a conveyance direction changing device configured by combining a plurality of the conveyance devices in FIG. 13A.

FIG. 13A is a perspective view of a conveyance device 65 obtained by improving the conveyance device disclosed in FIG. 1 of No. 736, FIG. 13B is a perspective view of a conveyance direction changing device 90 in which a plurality of the conveyance devices 65 in FIG. 13A is disposed in a plan, and FIG. 13C is a sectional view (partially enlarged sectional view) taken along line B-B in FIG. 13A. Most of the structure of the conveyance device 65 is similar to that of the conveyance device disclosed in No. 736, and description of the conveyance device 65 will be limited to the minimum here.

As shown in FIG. 13A, the conveyance device 65 has a pair of short rollers 66, a support member 67, a turning mechanism 68, and a rotation drive mechanism 69. Each short roller 66 configures a biasing member that biases and conveys the object to be conveyed (not shown). The support member 67 has a structure in which a disc-shaped top wall portion 67b is disposed at one end (upper end) of a cylindrical side wall portion 67a. That is, the support member 67 is a member having a space formed therein. The top wall portion 67b is provided with two long holes through which upper portions of the short rollers 66 protrude. Further, as shown in FIG. 13C, an annular groove 63 is provided in the vicinity of an edge 62 of the top wall portion 67b. The short rollers 66 are supported by the support member 67, and are synchronously rotated in the same direction by the rotation drive mechanism 69. Further, the support member 67 can be rotated (turned) around a vertical axis by the turning mechanism 68. That is, by rotating the support member 67 supporting each short roller 66, an orientation of an axis of each short roller 66 changes, and the biasing direction (conveyance direction) of the object to be conveyed by each short roller 66 can be changed.

A plurality of such conveyance devices 65 is disposed in a plane (vertically and horizontally) and is attached to a flat plate 95 (flat surface) to configure the conveyance direction changing device 90 (FIG. 13B). The flat plate 95 is provided with holes 95a in which each conveyance device 65 is disposed. Further, as shown by a chain double-dashed line in FIG. 13C, a hanging portion 96 extending downward is provided on an edge of each hole 95a. The hanging portion 96 has a cylindrical shape.

Each conveyance device 65 is disposed in each hole 95a in the flat plate 95, and the hanging portion 96 at the edge of each hole 95a is engaged with the annular groove 63 of the conveyance device 65. That is, the conveyance device 65 is fixed by the hanging portion 96. Further, although not shown in the drawings, a part below the support member 67 in each conveyance device 65 is also fixed to the fixed structure.

The support member 67 can be rotated by the turning mechanism 68 together with each short roller 66 (biasing member), and at this time, the annular groove 63 on the support member 67 rotates while keeping engaged with the hanging portion 96 on the flat plate 95 (flat surface portion). That is, the rotating annular groove 63 and the suspended hanging portion 96 slide. In other words, the hanging portion 96 functions as a guide when the support member 67 rotates.

Figure 14A:
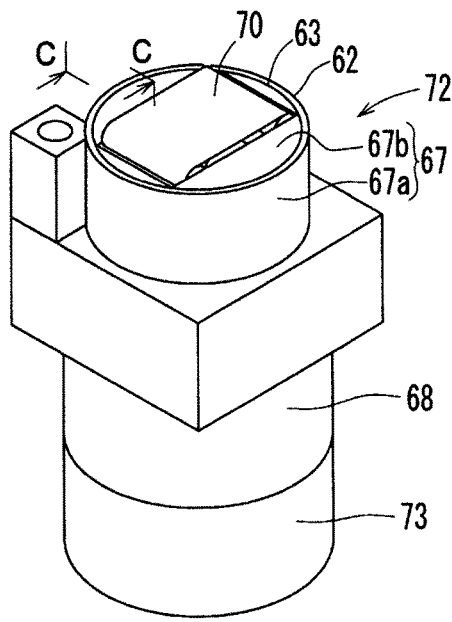
FIG. 14A is a perspective view of a conveyance device according to still another embodiment different from that of FIG. 13A.
Figure 14C:
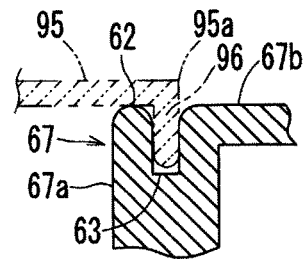
FIG. 14C is a sectional view taken along line C-C in FIG. 14A.
Figure 14B:
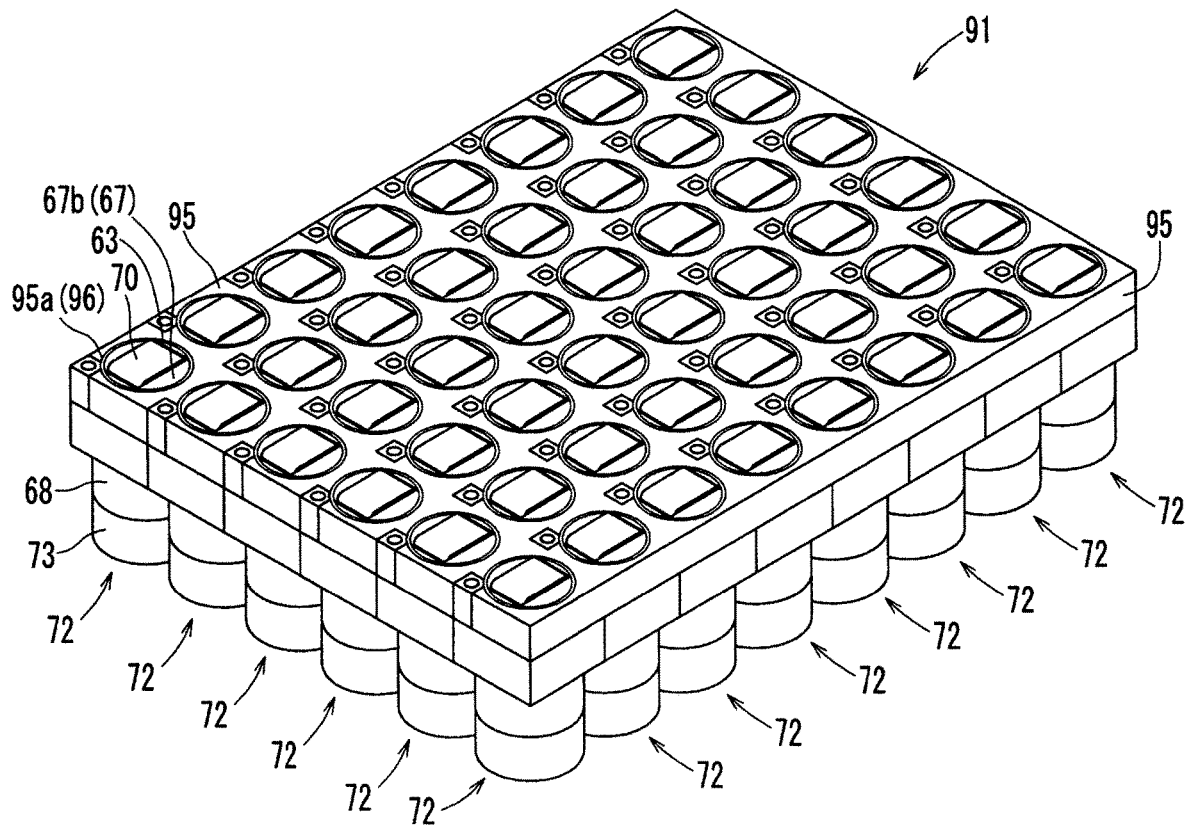
FIG. 14B is a perspective view of the conveyance direction changing device configured by combining a plurality of the conveyance devices in FIG. 14A.

Further, FIG. 14A is a perspective view of a conveyance device 72 obtained by improving the conveyance device disclosed in FIG. 1 of No. 736, FIG. 14B is a perspective view of a conveyance direction changing device 91 in which a plurality of the conveyance devices 72 in FIG. 14A is disposed in a plan, and FIG. 14C is a partially enlarged sectional view of FIG. 14A.

The conveyance device 72 is provided with a belt 70 (traveling body) instead of the short rollers 66 in the conveyance device 65 in FIG. 13A, and the other configuration of the conveyance device 72 is similar to that of the conveyance device 65. The belt 70 is driven by a belt drive mechanism 73 and configures a biasing member that biases and conveys the object to be conveyed. Further, the support member 67 can be turned (rotated) together with the belt 70 by the turning mechanism 68, and the conveyance direction of the object to be conveyed can be changed.

In the conveyance device 1 of the embodiment shown in FIGS. 1 to 10 described above, one driving body 50 is in contact with both the main rotating portion 34 (power transmission portion 40) and the sub rotating portion 35 (power transmission portion 42), and the driving body 50 has a dish-like shape. Thus, when the driving body 50 rotates in the direction R1 shown in FIG. 7A around the axis 51a of the rotation shaft 51 in the vertical posture, the power (rotational force) is transmitted from the driving body 50 to the main rotating portion 34 (power transmission portion 40), and the main rotating portion 34 is biased in the direction of rotation in the R2 direction around the axis 31a of the support shaft 31 in the horizontal posture.

Meanwhile, at this time, the power (rotational force) is also transmitted from the driving body 50 to the sub rotating portion 35 (power transmission portion 42), and the sub rotating portion 35 is biased around the support shaft 31 in the direction R3.

That is, the biasing direction received from the driving body 50 is opposite to that of the main rotating portion 34

(power transmission portion 40) and the sub rotating portion 35 (power transmission portion 42).

In order to address this problem, each conveyance device 1 of the above embodiment adopts a configuration in which the main rotating portion 34 and the sub rotating portion 35 do not contact each other and can rotate independently without interfering with each other.

Therefore, in the above embodiment, when the driving body 50 rotates in the direction R1 shown in FIG. 7A around the axis 51*a* of the vertical rotation shaft 51 in the vertical posture, the power (rotational force) is transmitted from the driving body 50 to the main rotating portion 34 (power transmission portion 40), and the main rotating portion 34 rotates in a direction R2 around the axis 31*a* of the support shaft 31 in the horizontal posture. Further, at this time, the power (rotational force) is transmitted from the driving body 50 to the sub rotating portion 35 (power transmission portion 42), and the sub rotating portion 35 also rotates in the direction R3 around the support shaft 31.

That is, the rotation direction R3 of the sub rotating portion 35 is opposite to the rotation direction R2 of the main rotating portion 34.

As another measure to address the problem that the biasing direction received from the driving body 50 is opposite in the main rotating portion 34 (power transmission portion 40) and the sub rotating portion 35 (power transmission portion 42), the main rotating portion 34 (power transmission portion 40) and the sub rotating portion 35 (power transmission portion 42) are directly or indirectly engaged with each other, and the main rotating portion 34 and the sub rotating portion 35 may be controlled to rotate in opposite directions.

Hereinafter, this configuration will be described. The following embodiment is common to many of the above embodiments, and common members are therefore denoted by the same reference numerals, and redundant description will be omitted.

Figure 15:
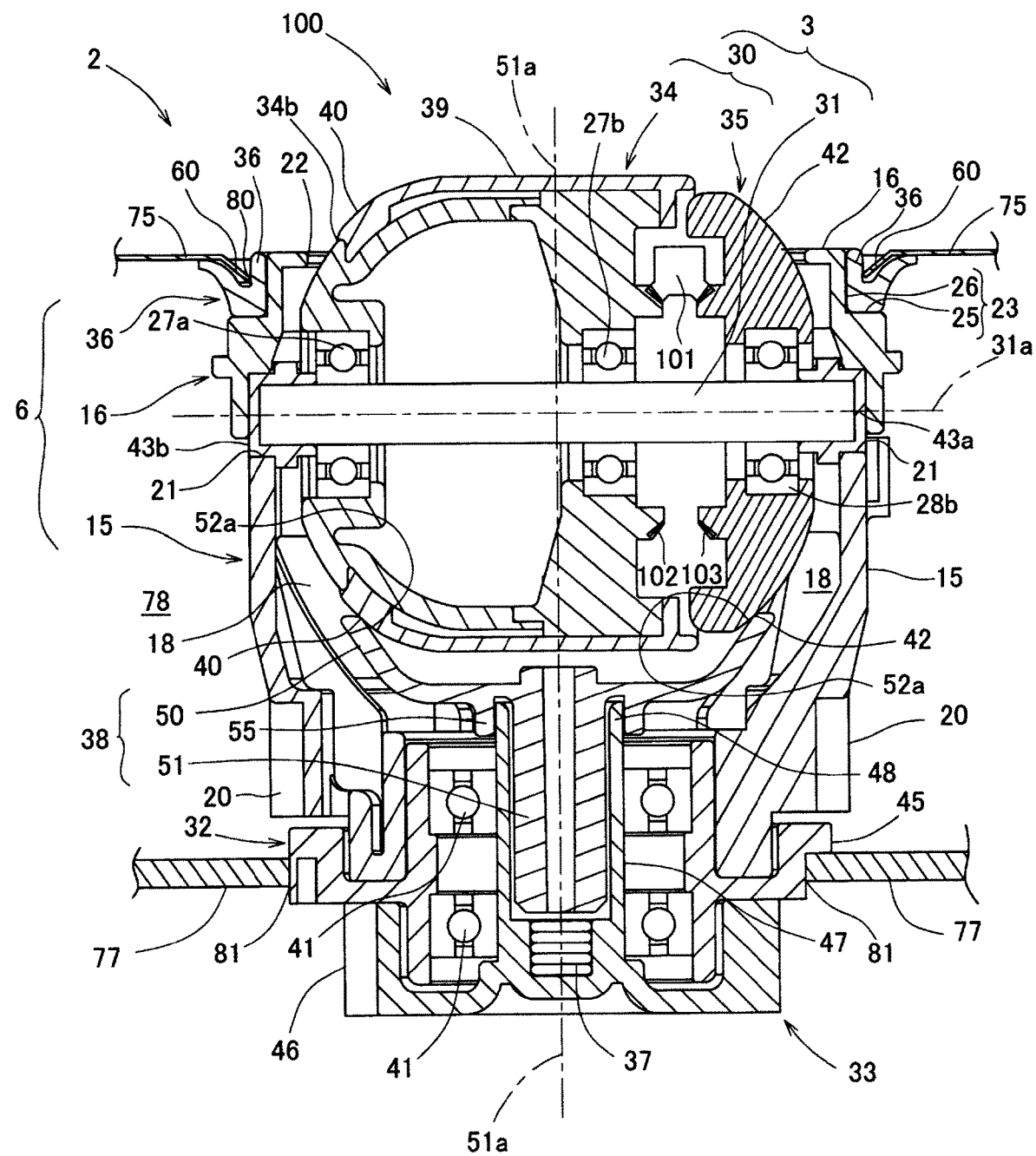
FIG. 15 is a sectional view of a conveyance device according to another embodiment of the present invention.
Figure 16:
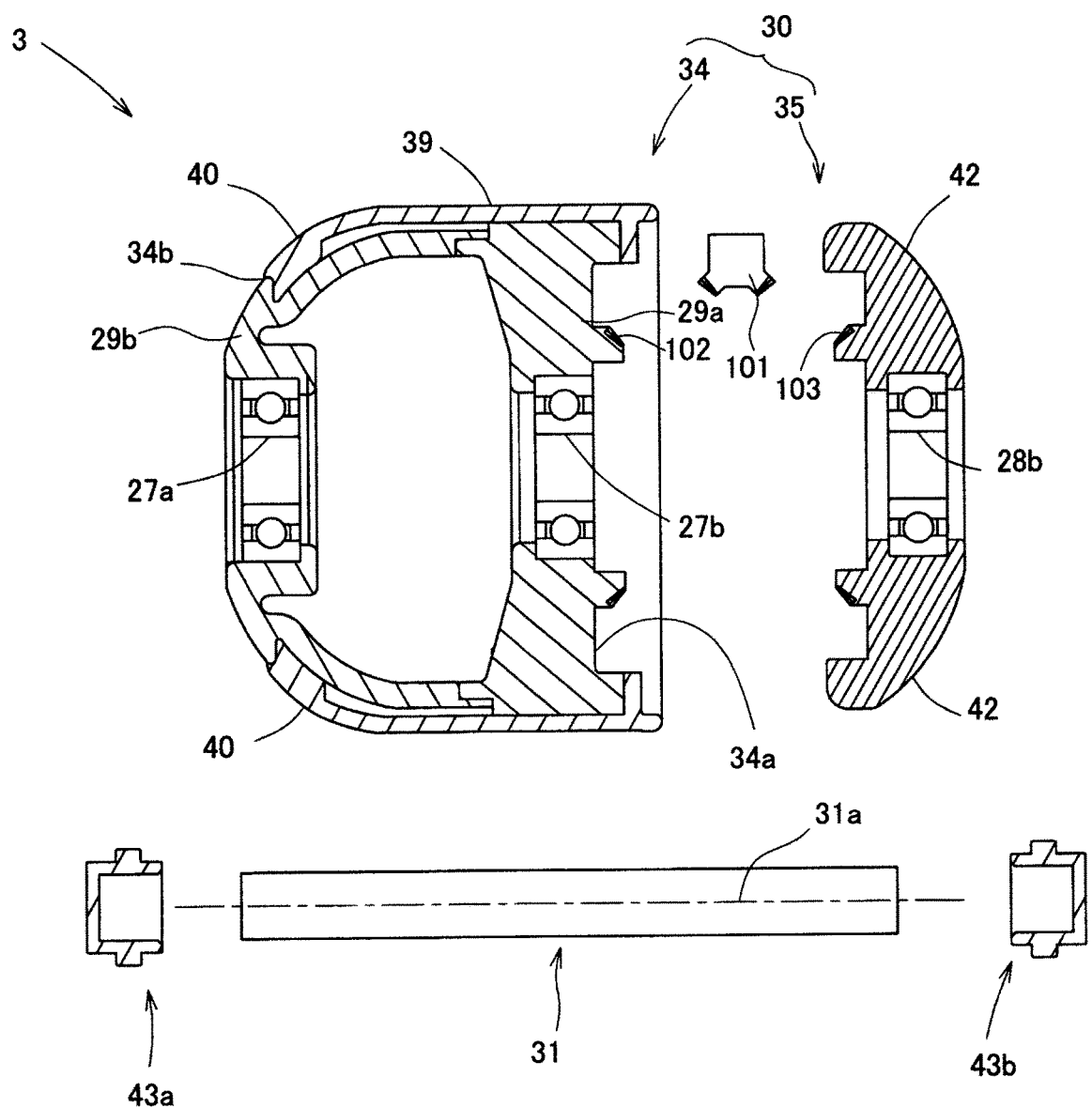
FIG. 16 is an exploded sectional view of a rotating body of the conveyance device in FIG. 15.

In a conveyance device 100 shown in FIGS. 15 and 16, the main rotating portion 34 and the sub rotating portion 35 are engaged via a bevel gear 101. The bevel gear 101 adopted in the present embodiment is an intermediate rotating body that rotates freely.

A bevel gear 102 is integrally fixed to the main rotating portion 34 adopted in the present embodiment. The bevel gear 102 is disposed concentrically with the support shaft 31.

Similarly, a bevel gear 103 is also integrally fixed to the sub rotating portion 35. The bevel gear 103 is also disposed concentrically with the support shaft 31.

The bevel gear 102 provided in the main rotating portion 34 and the bevel gear 103 provided in the sub rotating portion 35 have the same number of teeth.

The bevel gear 101 is between the bevel gear 102 and bevel gear 103, and is engaged with both bevel gears 102 and 103. The bevel gear 101 is attached to a certain position by a supporting means (not shown), and freely rotates at the position.

In the conveyance device 100 according to the present embodiment, when one of the main rotating portion 34 or the sub rotating portion 35 receives an external force and rotates in a certain direction, the other rotates in the opposite direction. The rotation speeds of the main rotating portion 34 and the sub rotating portion 35 are the same.

Therefore, the main rotating portion 34 and the sub rotating portion 35 rotate in the same direction as the biasing direction received from the driving body 50, and the power transmits from the driving body 50 to the main rotating portion 34 smoothly.

Figure 17:
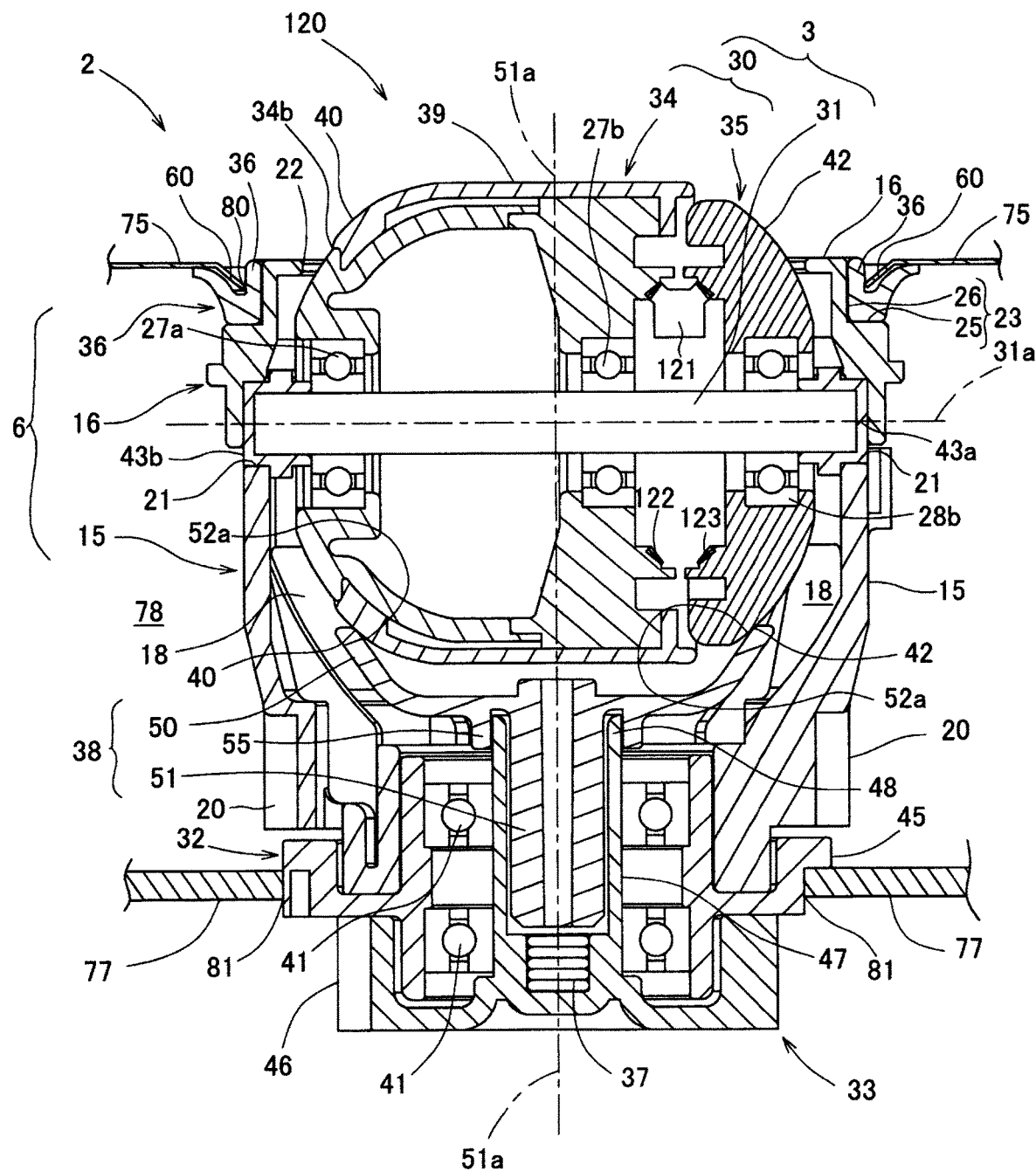
FIG. 17 is a sectional view of a conveyance device according to still another embodiment of the present invention.
Figure 18:
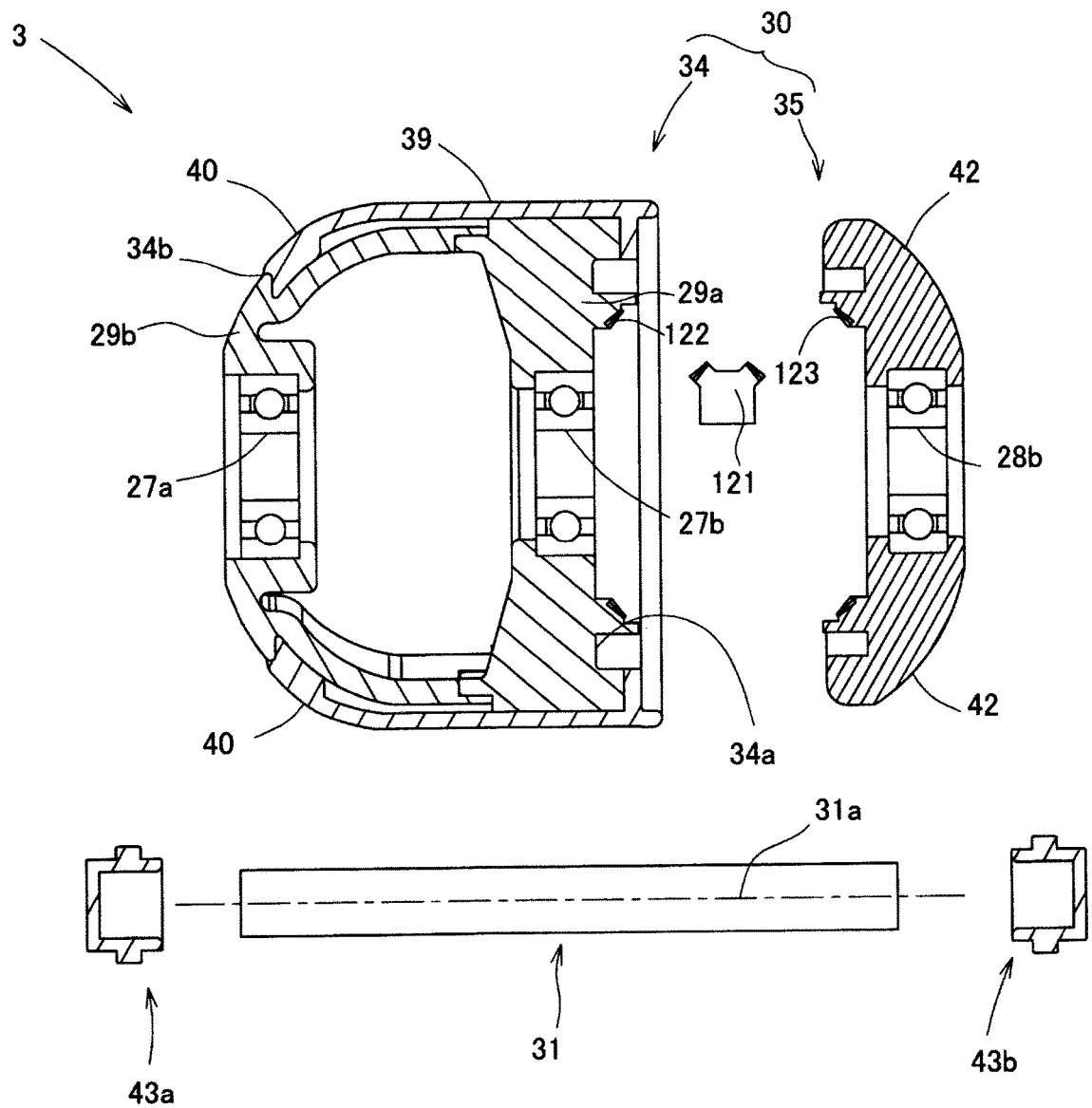
FIG. 18 is an exploded sectional view of a rotating body of the conveyance device shown in FIG. 17.

A conveyance device 120 shown in FIGS. 17 and 18 is a modification of the conveyance device described above.

In the conveyance device 120 shown in FIGS. 17 and 18, a bevel gear 122 with internal teeth is integrally fixed to the main rotating portion 34.

Similarly, a bevel gear (intermediate rotating body) 123 with internal teeth is integrally fixed to the sub rotating portion 35.

The bevel gear 122 provided in the main rotating portion 34 and the bevel gear 123 provided in the sub rotating portion 35 have the same number of teeth. The two bevel gears 122 and 123 have a shape similar to a disk and are located at opposite positions.

The bevel gear 121 is between the bevel gear 122 and the bevel gear 123 and is engaged with both bevel gears 122 and 123. The bevel gear 121 is also attached at a certain position by a supporting means (not shown), and freely rotates at the position. In the conveyance device 120, the bevel gear 121 is located between the two bevel gears 122 and 123 with the internal teeth.

Also, in the conveyance device 120 according to the present embodiment, when one of the main rotating portion 34 or the sub rotating portion 35 receives an external force and rotates in a certain direction, the other rotates in the opposite direction.

Therefore, the main rotating portion 34 and the sub rotating portion 35 rotate in the same direction as the biasing direction received from the driving body 50, and the power transmits from the driving body 50 to the main rotating portion 34 smoothly.

In the above embodiment, the main rotating portion 34 and the sub rotating portion 35 are interlocked via the bevel gear, but the present invention is not limited to this configuration. For example, a spur gear may be used to interlock the main rotating portion 34 and the sub rotating portion 35. Alternatively, a friction wheel may be used to interlock the main rotating portion 34 and the sub rotating portion 35.

The invention claimed is:

1. A conveyance device comprising:
    a rotating body including a main rotating portion and a sub rotating portion; and
    a driving body in contact with the main rotating portion and the sub rotating portion,
    the driving body supplying a rotational force to at least the main rotating portion,
    wherein the main rotating portion is rotatable around a first rotation axis while the sub rotating portion is rotatable in a direction different from a rotation direction of the main rotating portion,
    wherein the sub rotating portion is configured not to contact an object to be conveyed while the main rotating portion is configured to contact and bias the object to be conveyed,
    wherein the driving body is rotated by power around a second rotation axis, the second rotation axis having a direction intersecting with the first rotation axis,
    wherein the rotating body is configured to change an orientation of the rotating body, and
    wherein the driving body is in contact with the main and the sub rotating portions regardless of the orientation of the rotating body.

2. The conveyance device according to claim 1, wherein the rotating body has a support shaft, wherein the driving body is in contact with the main and the sub rotating portions to supply the rotational force to the main and the sub rotating portions, wherein the main and the sub rotating portions are attached along the support shaft, thereby being rotatable around the support shaft independently from each other, and wherein the support shaft is configured to rotate around a third shaft to change the orientation of the support shaft.

3. The conveyance device according to claim 1, wherein the rotating body has a support shaft, wherein the driving body is in contact with the main and the sub rotating portions to supply the rotational force to the main and the sub rotating portions, wherein the main and the sub rotating portions are attached along the support shaft, thereby being regulated to rotate around the support shaft in an opposite direction with each other, and wherein the support shaft is configured to rotate around a third shaft to change the orientation of the support shaft.

4. The conveyance device according to claim 1, wherein an intermediate rotating body is interposed between the main and the sub rotating portions to regulate the main and the sub rotating portions so as to rotate in an opposite direction with each other.

5. The conveyance device according to claim 1, wherein a bevel gear is interposed between the main and the sub rotating portions to regulate the main and the sub rotating portions so as to rotate in an opposite direction with each other.

6. The conveyance device according to claim 1, wherein a bevel gear with internal teeth is provided both inside the main and the sub rotating portions, the bevel gears with the internal teeth being engaged with a bevel gear with external teeth.

7. The conveyance device according to claim 1, wherein an external shape combining the main and the sub rotating portions is a spherical shape, a barrel shape, or a cylindrical shape, wherein a part of a circumference of the main rotating portion around a direction of the first rotation axis and a part of a circumference of the sub rotating portion around the direction of the first rotation axis are in contact with the driving body regardless of the orientation of the rotating body, and wherein the other parts of the main rotating portion and the sub rotating portion are substantially not in contact with the driving body.

8. The conveyance device according to claim 1, wherein the driving body includes a contact portion having an annular shape, wherein the contact portion is in contact with a part of the main rotating portion and a part of the sub rotating portion, and wherein the contact portion rotates to cause the main and the sub rotating portions to rotate.

9. The conveyance device according to claim 1, further comprising a first power transmission member that transmits power from another member to the driving body to cause the driving body to rotate.

10. The conveyance device according to claim 1, further comprising:

a support member that rotatably supports the main and the sub rotating portions around the first rotation axis; and a second power transmission member that causes the support member to rotate around a rotation axis in a direction intersecting with the first rotation axis when the power is transmitted from another member.

11. The conveyance device according to claim 1, wherein a part of the main rotating portion and a part of the sub rotating portion include an elastically deformable material, the part of the main rotating portion and the part of the sub rotating portion being in contact with the driving body.

12. A conveyance direction changing device comprising a plurality of the conveyance devices according to claim 10, wherein the plurality of the conveyance devices are disposed in a plane, and wherein power is transmitted between the second power transmission members of the adjacent conveyance devices.

13. A conveyance direction changing device comprising:

a plurality of the conveyance devices according to claim 10; and a fixing member having a flat surface, the flat surface including a plurality of holes disposed in a plane, the conveyance devices being disposed in the holes, each of the holes including a hanging portion that hangs downward at an edge of each of the holes, wherein the support member of each of the conveyance devices has an engagement portion slidably engaged with the hanging portion, and wherein an upper portion of the main rotating portion of each of the conveyance devices protrudes above the flat surface of the fixing member.

14. The conveyance device according to claim 3, wherein an intermediate rotating body is interposed between the main and the sub rotating portions to regulate the main and the sub rotating portions so as to rotate in an opposite direction with each other.

15. The conveyance device according to claim 3, wherein a bevel gear is interposed between the main and the sub rotating portions to regulate the main and the sub rotating portions so as to rotate in an opposite direction with each other.

16. The conveyance device according to claim 3, wherein a bevel gear with internal teeth is provided both inside the main and the sub rotating portions, the bevel gears with the internal teeth being engaged with a bevel gear with external teeth.

17. The conveyance device according to claim 3, wherein an external shape combining the main and the sub rotating portions is a spherical shape, a barrel shape, or a cylindrical shape, wherein a part of a circumference of the main rotating portion around a direction of the first rotation axis and a part of a circumference of the sub rotating portion around the direction of the first rotation axis are in contact with the driving body regardless of the orientation of the rotating body, and wherein the other parts of the main rotating portion and the sub rotating portion are substantially not in contact with the driving body.

18. The conveyance device according to claim 3, wherein the driving body includes a contact portion having an annular shape, wherein the contact portion is in contact with a part of the main rotating portion and a part of the sub rotating portion, and wherein the contact portion rotates to cause the main and the sub rotating portions to rotate.

19. The conveyance device according to claim 3, further comprising a first power transmission member that transmits power from another member to the driving body to cause the driving body to rotate.

20. The conveyance device according to claim 3, further comprising:
- a support member that rotatably supports the main and the sub rotating portions around the first rotation axis; and
- a second power transmission member that causes the support member to rotate around a rotation axis in a direction intersecting with the first rotation axis when the power is transmitted from another member.

21. The conveyance device according to claim 3, wherein a part of the main rotating portion and a part of the sub rotating portion include an elastically deformable material, the part of the main rotating portion and the part of the sub rotating portion being in contact with the driving body.

22. A conveyance direction changing device comprising a plurality of the conveyance devices according to claim 20,
wherein the plurality of the conveyance devices are disposed in a plane, and
wherein power is transmitted between the second power transmission members of the adjacent conveyance devices.

23. A conveyance direction changing device comprising:
- a plurality of the conveyance devices according to claim 20; and
- a fixing member having a flat surface,
- the flat surface including a plurality of holes disposed in a plane,
- the conveyance devices being disposed in the hole,
- each of the holes including a hanging portion that hangs downward at an edge of each of the holes,
- wherein the support member of each of the conveyance devices has an engagement portion slidably engaged with the hanging portion, and
- wherein an upper portion of the main rotating portion of each of the conveyance devices protrudes above the flat surface of the fixing member.

* * * * *